(12) United States Patent
Suzuki et al.

(10) Patent No.: US 10,547,581 B2
(45) Date of Patent: Jan. 28, 2020

(54) ELECTRONIC MAIL ERRONEOUS TRANSMISSION PREVENTION SUPPORTING DEVICE AND ELECTRONIC MAIL ERRONEOUS TRANSMISSION PREVENTION SUPPORTING METHOD

(71) Applicants: FUJITSU LIMITED, Kawasaki-shi, Kanagawa (JP); FUJITSU SOCIAL SCIENCE LABORATORY LIMITED, Kawasaki-shi, Kanagawa (JP)

(72) Inventors: Takuya Suzuki, Ota (JP); Masahiko Tamiya, Higashikurume (JP); Yoichi Iwata, Yokohama (JP); Takeshi Osako, Kawasaki (JP); Naoya Hirao, Kawasaki (JP); Takahiro Tanaka, Kawasaki (JP); Ryota Fukazawa, Minato (JP); Teruaki Hirakawa, Kawasaki (JP); Kohei Arai, Meguro (JP); Yoshitaka Koyama, Yokohama (JP)

(73) Assignees: FUJITSU LIMITED, Kawasaki (JP); FUJITSU SOCIAL SCIENCE LABORATORY LIMITED, Kawasaki (JP)

( * ) Notice: Subject to any disclaimer, the term of this patent is extended or adjusted under 35 U.S.C. 154(b) by 313 days.

(21) Appl. No.: 15/345,011

(22) Filed: Nov. 7, 2016

(65) Prior Publication Data
US 2017/0134331 A1 May 11, 2017

(30) Foreign Application Priority Data
Nov. 10, 2015 (JP) .................................. 2015-220519

(51) Int. Cl.
*H04L 12/58* (2006.01)

(52) U.S. Cl.
CPC .............. *H04L 51/28* (2013.01); *H04L 51/12* (2013.01); *H04L 51/22* (2013.01); *H04L 51/30* (2013.01); *H04L 51/02* (2013.01); *H04L 51/063* (2013.01)

(58) Field of Classification Search
CPC ....... H04L 51/02; H04L 51/063; H04L 51/12; H04L 51/22
See application file for complete search history.

(56) References Cited

U.S. PATENT DOCUMENTS 8,775,332 B1 * 7/2014 Morris .................... G06N 20/00
706/11
2012/0124664 A1 * 5/2012 Stein ....................... G06F 15/16
726/22

(Continued)

FOREIGN PATENT DOCUMENTS

JP 1-273450 11/1989
JP 6-242718 9/1994

(Continued)

OTHER PUBLICATIONS

Notice of Reasons for Refusal for corresponding Japanese Patent Application No. 2015-220519 dated Jun. 11, 2019.

(Continued)

*Primary Examiner* — Todd L Barker
(74) *Attorney, Agent, or Firm* — Staas & Halsey LLP

(57) ABSTRACT

When an electronic mail is transmitted, a computer outputs to a display device a transmission confirmation screen on which a destination or an attached file name is displayed, the destination or the attached file name being different from a destination or an attached file name that has been set by a user in the electronic mail, and on which whether transmission of the electronic mail will be performed is selectable. Upon receipt of selection of whether the transmission will be performed, the computer outputs to the display device (Continued)

message information that varies according to a result of the selection of whether the transmission will be performed on the transmission confirmation screen.

5 Claims, 23 Drawing Sheets

(56) References Cited

U.S. PATENT DOCUMENTS

| | | | |
|---|---|---|---|
| 2012/0124671 A1* | 5/2012 | Fritzson | G06F 21/577 |
| | | | 726/26 |
| 2012/0198007 A1* | 8/2012 | Fujiwara | H04L 51/28 |
| | | | 709/206 |
| 2015/0050623 A1 | 2/2015 | Falash et al. | |

FOREIGN PATENT DOCUMENTS

| | | |
|---|---|---|
| JP | 2011-192063 | 9/2011 |
| JP | 2014-127016 | 7/2014 |
| JP | 2015-001854 G * | 1/2015 |

OTHER PUBLICATIONS

Written Opinion for corresponding Singapore Patent Application No. 10201609282X dated Sep. 30, 2019.

* cited by examiner

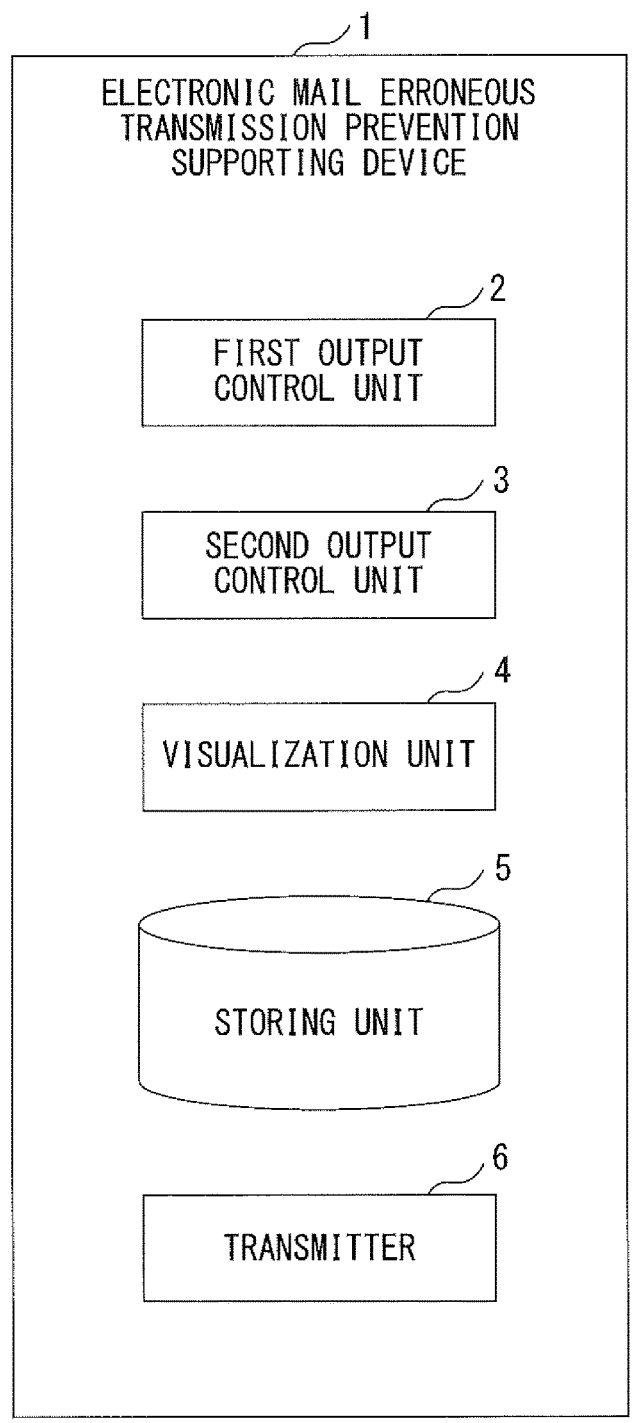
F I G. 1

11

To: sannkakusannkaku@marumaru.co.jp

Cc:

SUBJECT ESTIMATE ANSWER (TO ○○ INC.)

ATTACHMENT estimate_○○Inc.zip

○○ INC.   MR. △△

DEAR MR. △△:

PLEASE SEE THE ATTACHED ESTIMATE IN RESPONSE TO YOUR REQUEST
OF THE OTHER DAY.

××  INC.    SALES DEPARTMENT
MYOUJI NAMAE
Mail:myoujinamae@batsubatsu.co.jp
TEL:VVVVVVVVVV

TRANSMIT    16

To: sannkakusannkaku@marumaru.co.jp

Cc:

SUBJECT: ESTIMATE ANSWER (TO ○○ INC.)

ATTACHMENT: estimate_○○Inc.zip

THE PREVIOUSLY DISPLAYED TRANSMISSION CONFIRMATION SCREEN IS A SCREEN FOR "TRAINING". A TRANSMISSION DESTINATION, A SUBJECT, AND AN ATTACHED FILE HAVE BEEN INTENTIONALLY CHANGED TO WRONG ONES, BUT YOU "TRANSMITTED" A MAIL. PLEASE CAREFULLY CONFIRM A TRANSMISSION CONFIRMATION SCREEN IN THE FUTURE.

[ OK ]

TEL. VVVVVVVVV

[ TRANSMIT ]

```
┌─────────────────────────────────────────────────────────┐
│                                                      ~41│
│ To:    [ myoujinamae@batsubatsu.co.jp ]                 │
│                                                         │
│ Cc:    [                              ]                 │
│                                                         │
│ SUBJECT [ Re:ESTIMATE ANSWER (TO ■■ INC.) ]             │
│                                                         │
│   ┌───────────────────────────────────────────────────┐ │
│   │ ■■ INC.    SALES DEPARTMENT                       │ │
│   │ MR. MYOUJI NAMAE                                  │ │
│   │                                                   │ │
│   │ DEAR MR. MYOUJI NAMAE:                            │ │
│   │                                                   │ │
│   │ WE RECEIVED A MAIL FOR WHICH A SUBJECT IS "ESTIMATE│ │
│   │ ANSWER", BUT WE HAVE NOT REQUESTED AN ESTIMATE.   │ │
│   │ DID YOU SEND THE MAIL IN ERROR?                   │ │
│   │ ─────────────────────────────                     │ │
│   │ ■■ INC.                                           │ │
│   │ △△                                                │ │
│   │ Mail : sannkakusannkaku@shikakushikaku.co.jp      │ │
│   └───────────────────────────────────────────────────┘ │
└─────────────────────────────────────────────────────────┘
     42─╯      43─╯
```

FIG. 9

To: sannkakusannkaku@marumaru.co.jp
Cc:
SUBJECT: ESTIMATE ANSWER (TO ○○ INC.)
ATTACHMENT: estimate_○○Inc.zip YOU NOTICED WELL.
THE "DESTINATION", "SUBJECT", AND "ATTACHED FILE" HAVE BEEN INTENTIONALLY CHANGED TO WRONG ONES ON THE PREVIOUS TRANSMISSION CONFIRMATION SCREEN.
YOU PASSED ERRONEOUS TRANSMISSION TRAINING.

OK

TEL: VVVVVVVVVV

TRANSMIT

FIG. 13A

| MISREPRESENTATION ITEM | EXAMPLE |
|---|---|
| SUBJECT MISREPRESENTATION | CHANGE SUBJECT TO SUBJECT INCLUDING TYPOS OR OMISSIONS |
| | CHANGE SUBJECT TO SUBJECT OF MAIL THAT HAS BEEN PREVIOUSLY TRANSMITTED |
| DESTINATION MISREPRESENTATION | ADD MECHANICALLY GENERATED DESTINATION |
| | DELETE SET DESTINATION |
| | CHANGE DESTINATION TO DESTINATION OF MAIL THAT HAS BEEN PREVIOUSLY TRANSMITTED |
| ATTACHED FILE NAME MISREPRESENTATION | CHANGE ATTACHED FILE NAME TO FILE NAME MECHANICALLY GENERATED |
| | CHANGE ATTACHED FILE NAME TO NAME OF FILE THAT HAS BEEN PREVIOUSLY TRANSMITTED |
| ATTACHED FILE EXTENSION MISREPRESENTATION | EX.: WHEN PDF FILE IS ATTACHED, CHANGE ICON TO ICON OF MS WORD, AND CHANGE EXTENSION TO xls |
| | EX.: WHEN PDF FILE IS ATTACHED, CHANGE ICON TO ICON OF xls, AND CHANGE EXTENSION TO xls |

FIG. 13B

| LEVEL | NUMBER OF MISREPRESENTATIONS ON TRANSMISSION CONFIRMATION SCREEN | DETERMINATION CRITERIA |
|---|---|---|
| LOW | MISREPRESENT THREE ITEMS, "SUBJECT", "DESTINATION", AND "ATTACHED FILE" | CRITERIA ARE SATISFIED IF AT LEAST ONE MISREPRESENTATION IS NOTICED. |
| INTERMEDIATE | MISREPRESENT TWO ITEMS OF "SUBJECT", "DESTINATION", AND "ATTACHED FILE" | |
| HIGH | MISREPRESENT ONE ITEM OF "SUBJECT", "DESTINATION", AND "ATTACHED FILE" | |

FIG. 14A

| LEVEL | NUMBER OF MISREPRESENTATIONS ON TRANSMISSION CONFIRMATION SCREEN | DETERMINATION CRITERIA |
|---|---|---|
| LOW | MISREPRESENT THREE ITEMS, "SUBJECT", "DESTINATION", AND "ATTACHED FILE" | CRITERIA ARE SATISFIED IF AT LEAST ONE MISREPRESENTATION IS NOTICED. |

FIG. 14B

| ITEM | MISREPRESENTATION METHOD |
|---|---|
| SUBJECT MISREPRESENTATION | (*1) CHANGE SUBJECT TO SUBJECT OF MAIL THAT HAS BEEN PREVIOUSLY TRANSMITTED |
| DESTINATION MISREPRESENTATION | (*2) CHANGE DESTINATION TO DESTINATION OF MAIL THAT HAS BEEN PREVIOUSLY TRANSMITTED |
| ATTACHED FILE NAME MISREPRESENTATION | (*3) CHANGE ATTACHED FILE NAME TO NAME OF FILE THAT HAS BEEN PREVIOUSLY TRANSMITTED |

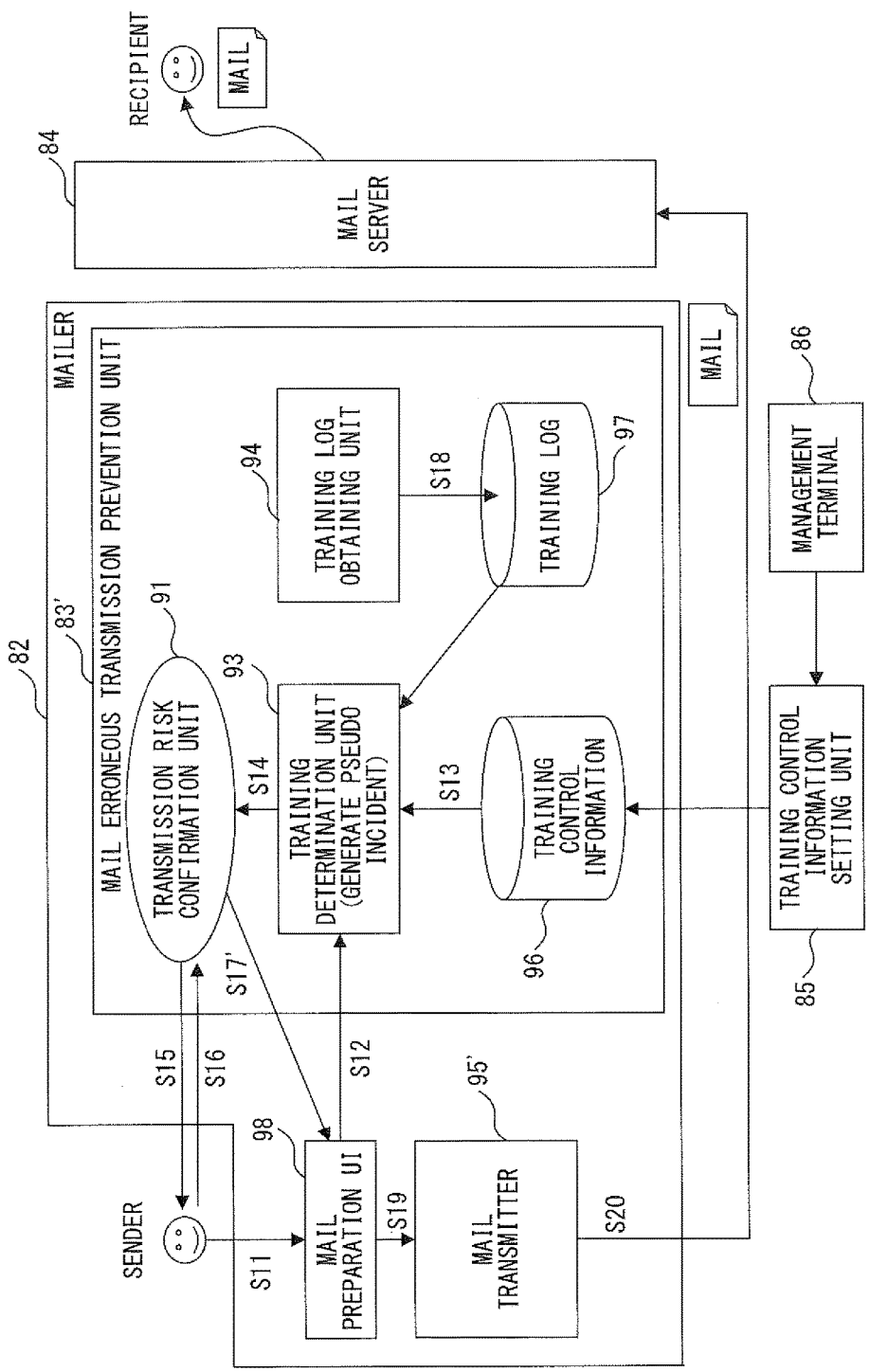
F I G. 17

ELECTRONIC MAIL ERRONEOUS TRANSMISSION PREVENTION SUPPORTING DEVICE AND ELECTRONIC MAIL ERRONEOUS TRANSMISSION PREVENTION SUPPORTING METHOD

CROSS-REFERENCE TO RELATED APPLICATION

This application is based upon and claims the benefit of priority of the prior Japanese Patent Application No. 2015-220519, filed on Nov. 10, 2015, the entire contents of which are incorporated herein by reference.

FIELD

The embodiments discussed herein are related to an electronic mail erroneous transmission prevention supporting device and an electronic mail erroneous transmission prevention supporting method.

BACKGROUND

In recent years, due to the wide spread of an information and communications technology (ICT), communication by electronic mail or the like of information between users by using electronic mail software (hereinafter referred to as a "mailer") has increased.

However, due to the wide spread of electronic mails, erroneous transmission of an electronic mail often occurs. As an example, an electronic mail having a fault, such as an electronic mail with a wrong transmission destination address, an electronic mail to which a wrong file has been attached, or an electronic mail including a defective subject, may be erroneously transmitted without a user noticing the fault.

As a technology for making countermeasures against the erroneous transmission above, a first technology has been proposed, for example (see, for example, Patent Document 1). In the first technology, a computer measures a value indicating an operation state of a user on the basis of operation related information relating to the user's operation that has been input via an input device. The computer determines which is greater, a measurement value obtained as a result of measurement or a threshold. The computer outputs, to an output device, a message to prompt the user to review input information that the user has input, in accordance with a determination result.

By doing this, even when a user generates and transmits electronic information in a hurry, when there is a possibility of an input error, the possibility can be pointed out, and the user can be prompted to review the generated electronic information.

Patent Document 1: Japanese Laid-open Patent Publication No. 2011-192063
Patent Document 2: Japanese Laid-open Patent Publication No. 1-273450
Patent Document 3: Japanese Laid-open Patent Publication No. 6-242718

SUMMARY

According to an aspect of the embodiments, a non-transitory computer-readable recording medium stores an electronic mail erroneous transmission prevention supporting program for causing a computer to execute the following process.

When an electronic mail is transmitted, a computer outputs to a display device a transmission confirmation screen on which a destination or an attached file name is displayed, the destination or the attached file name being different from a destination or an attached file name that has been set by a user in the electronic mail, and on which whether transmission of the electronic mail will be performed is selectable. Upon receipt of selection of whether the transmission will be performed, the computer outputs to the display device message information that varies according to a result of the selection of whether the transmission will be performed on the transmission confirmation screen.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an electronic mail erroneous transmission prevention supporting device according to the embodiments;

FIG. 3 illustrates a mail preparation screen according to the embodiments;

FIG. 6 illustrates a training reporting screen according to the embodiments;

FIG. 8 illustrates a received pseudo restraining mail according to the embodiments;

FIG. 9 illustrates a training passing reporting screen according to the embodiments;

FIG. 13A is a diagram explaining a transmission confirmation screen misrepresentation item according to the embodiments;

FIG. 13B is a diagram explaining a mail erroneous transmission countermeasure level according to the embodiments;

FIG. 14A illustrates a low mail erroneous transmission countermeasure level according to the embodiments;

FIG. 14B illustrates a misrepresentation method that corresponds to a low level according to the embodiments;

FIG. 17 illustrates a mail erroneous transmission prevention unit in another example of the embodiments;

DESCRIPTION OF EMBODIMENTS

Figure 2:
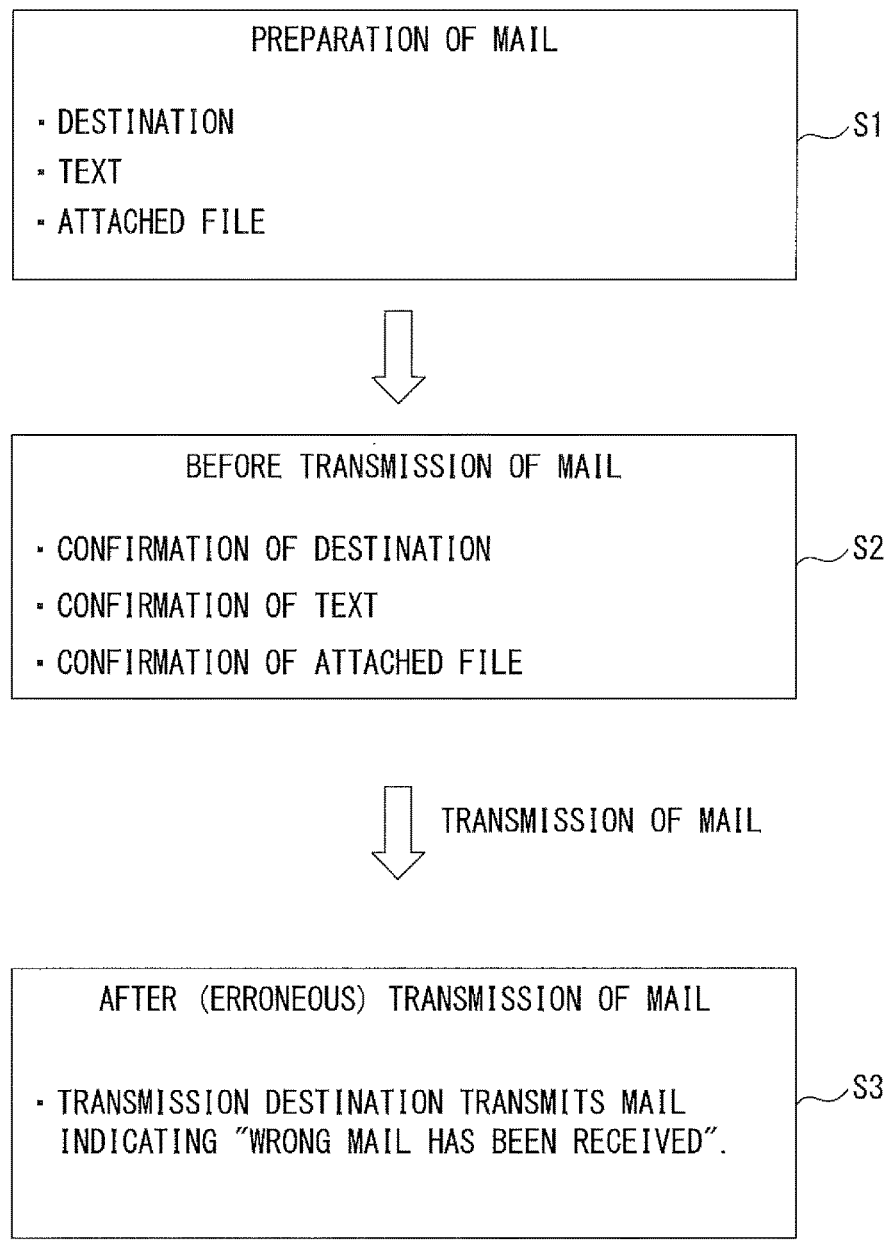
FIG. 2 illustrates a process for generating a mail including a pseudo error so as to generate a situation that triggers erroneous transmission of an electronic mail according to the embodiments.

Embodiments are described below in detail with reference to the drawings.

In the first technology above, even when a situation that will cause an accident occurs, damage is reduced by preventing the accident. Therefore, this countermeasure seems to be effective. However, this is only hindsight, and it is originally preferable that a situation that will cause an accident be prevented from occurring.

In order to prevent a situation that will cause an accident or an accident, it is considered to provide a user with education or a countermeasure to prevent electronic mails from being erroneously transmitted (to confirm a destination, an attached file, or the like).

However, it is not easy to objectively measure an effect of the education above. Accordingly, it is preferable that a user is spontaneously motivated to recognize a risk of erroneous transmission of electronic mails and to make efforts to not erroneously transmit electronic mails.

FIG. 1 illustrates an example of an electronic mail erroneous transmission prevention supporting device according to the embodiments. An electronic mail erroneous transmission prevention supporting device 1 includes a first output control unit 2 and a second output control unit 3.

The first output control unit 2 outputs to a display device a transmission confirmation screen on which a destination or the name of an attached file that is different from a destination or the name of an attached file that has been set by a user in an electronic mail is displayed and on which whether transmission of the electronic mail will be executed can be selected, when the electronic mail is transmitted. Examples of the first output control unit 2 include the transmission risk confirmation unit 91 described later.

Upon receipt of selection of whether transmission will be executed, the second output control unit 3 outputs to the display device message information that is different according to a result of selecting whether transmission will be executed on the transmission confirmation screen. Examples of the second output control unit 3 include the transmission risk confirmation unit 91 described later.

By employing the configuration above, prevention of electronic mails from being erroneously transmitted can be supported.

The first output control unit 2 can display a transmission confirmation screen on which a destination set by a user in an electronic mail has been changed to a destination of any of the transmitted electronic emails, a destination generated at random has been added to the destination set by the user, or any of plural destinations has been deleted if the plural destinations were set by the user.

By employing the configuration above, a pseudo incident relating to a destination of an electronic mail can be generated.

The first output control unit 2 can also display a transmission confirmation screen on which the name of a file attached to an electronic mail has been changed to the name of a file attached to a transmitted electronic mail, a name generated at random, or the name of data stored in a storing unit (storage) of a computer.

By employing the configuration above, a pseudo incident relating to the name of an attached file can be generated.

The electronic mail erroneous transmission prevention supporting device 1 further includes a storing unit 5 and a visualization unit 4. The storing unit 5 stores a result of selecting whether transmission will be executed. The visualization unit 4 visualizes and displays a level of a security countermeasure of a user who performs a selection operation on the basis of the result of selecting whether transmission will be executed that has been stored in the storing unit 5. Examples of the storing unit 5 include the RAM 106 and the storage 107 described later that store a training log 97. Examples of the visualization unit 4 include the transmission risk confirmation unit 91 described later.

By employing the configuration above, an effect of security education training can be measured and visualized.

The electronic mail erroneous transmission prevention supporting device 1 further includes a transmitter 6. When transmission of an electronic mail is selected on the transmission confirmation screen, the transmitter 6 transmits to a transmission source of the electronic mail an electronic mail that includes information indicating that erroneous transmission of an electronic mail has occurred. Examples of the transmitter 6 include the transmission risk confirmation unit 91 described later.

By employing the configuration above, a pseudo restraining mail can be transmitted. This enables a user to be startled and be strongly impressed, and an education effect can be expected to increase.

When cancellation of transmission of an electronic mail is selected on the transmission confirmation screen, the second output control unit 3 outputs information indicating that a destination or the name of an attached file has been changed on the transmission configuration screen. Then, the first output control unit 2 outputs a transmission confirmation screen that displays a destination or the name of an attached file that has been set by the user in the electronic mail.

By employing the configuration above, correct information that has been set by a user can be displayed after a report indicating that a pseudo incident has occurred is issued.

The embodiments are described below in more detail. Hereinafter, an electronic mail is referred to as a "mail".

According to the embodiments, a pseudo situation of erroneous transmission is generated, and an effect of education or a countermeasure is measured. Erroneous transmission is simulated intentionally, and therefore erroneous transmission can be identified. Specifically, as an example, a destination address that has been mechanically changed is displayed on a configuration screen immediately before transmission (it is measured whether a destination is confirmed at the time of transmission), or a mail indicating that a wrong mail has been received is transmitted from a transmission destination.

According to the embodiments, a pseudo situation that will cause an accident is generated, as an example, according to the methods (A), (B), and (C) below.

(A) When transmitting a mail, a pseudo incident, such as a change in a destination address (a pseudo wrong transmission destination), deletion of half of the text of a mail (a pseudo unfinished mail), or a change in an attached file (a pseudo wrong attached file), is mechanically generated.

(B) A transmission confirmation screen is displayed, it is checked whether a process for transmitting a mail has been performed without noticing that a pseudo incident has occurred, and an effect of a security countermeasure is visualized on the erroneous transmission countermeasure level reporting screen 61 described later.

(C) A pseudo mail indicating that a wrong mail has been received is transmitted from a transmission destination, and an effect of a security countermeasure (incident-countermeasure education training) is measured.

(A) to (C) are performed individually or in combination according to the following flows (patterns).

(Pattern 1) (A)→(B)

(Pattern 2) (A)→(B)→(C): Pattern 2 is performed in a case in which a transmission process is performed in (B) without noticing that a pseudo incident has occurred.

(Pattern 3) Only (C)

FIG. 2 illustrates a process for generating a mail including a pseudo error so as to generate a situation that triggers erroneous transmission of an electronic mail according to the embodiments.

When preparing a mail, a user uses a mail preparation function of a mailer so as to input a destination and a text to the mail, and to attach a file to the mail when the file is transmitted (S1).

When the user executes transmission of the mail, a program according to the embodiments is executed such that a pseudo incident, such as a change in a destination address displayed on the transmission confirmation screen to a wrong destination address, deletion of half of a text, or a change in the name of an attached file, is generated (S2). Consequently, it is tested, for example, whether the user has confirmed a transmission destination, whether the user has confirmed a text, or whether the user has confirmed the name of an attached file.

When the user transmits a mail without confirming a destination address, a text, or the name of an attached file, namely, when the user erroneously transmits a mail, a mail indicating that a wrong mail has been received is transmitted from a pseudo transmission destination (a mailer) (S3).

FIG. 3 illustrates a mail preparation screen according to the embodiments. A mail preparation screen 11 is displayed on a display by starting a mailer installed onto a personal computer (PC) so as to execute a mail preparation command.

The mail preparation screen 11 includes a transmission destination address input field 12, a subject input field 13, a file attachment field 14, a text input field 15, and a transmission button 16. An address of a transmission destination is input to the transmission destination address input field 12. The subject of a mail is input to the subject input field 13. A file to be attached to a mail is set in the file attachment field 14. A text of a mail is input to the text input field 15. When the transmission button 16 is pressed, the transmission confirmation screed described with reference to FIG. 4 is displayed.

A user first starts a mailer on a PC. The user finishes writing a text on the mail preparation screen, inputs, for example, a destination in the transmission destination address input field 12 and a subject in the subject input field 13, and attaches a file, as illustrated in FIG. 3, and the user presses the transmission button 16. Then, the transmission confirmation screen described with reference to FIG. 4 is displayed.

Figure 4:
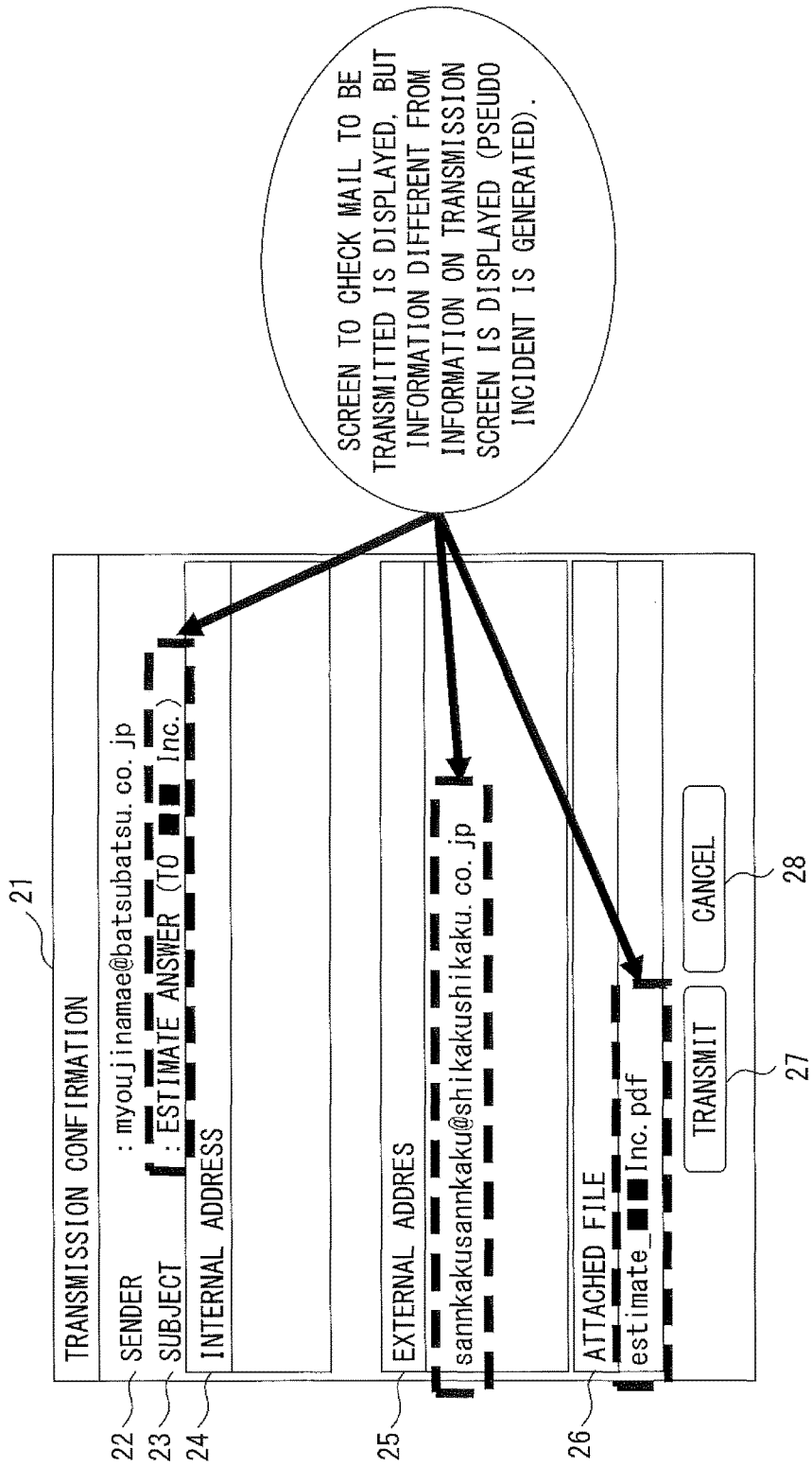
FIG. 4 illustrates a transmission confirmation screen according to the embodiments.

FIG. 4 illustrates a transmission confirmation screen according to the embodiments. A transmission confirmation screen 21 is a screen used to confirm a transmission destination and an attached file of a mail prepared on the mail preparation screen 11 before the mail is actually transmitted.

The transmission confirmation screen 21 includes a sender display field 22, a subject display field 23, an internal transmission destination address display field 24, an external transmission destination address display field 25, an attached file display field 26, a transmission button 27, and a cancellation button 28. A transmission source address is displayed in the sender display field 22. A subject that has been input in the subject input field 13 on the mail preparation screen 11 is displayed in the subject display field 23.

A transmission destination address that has been input in the transmission destination address input field 12 on the mail preparation screen 11 is displayed in the internal transmission destination address display field 24, when the transmission destination address that has been input in the transmission destination address input field 12 is a mail address inside an organization that a user belongs to.

A transmission destination address that has been input in the transmission destination address input field 12 on the mail preparation screen 11 is displayed in the external transmission destination address display field 25, when the transmission destination address that has been input in the transmission destination address input field 12 is a mail address outside an organization that a user belongs to.

A file name that has been set in the file attachment field 14 on the mail preparation screen 11 is displayed in the attached file display field 26.

In the case of a regular transmission confirmation screen, when the transmission button 27 is pressed, a mail that has been prepared on the mail preparation screen 11 is actually transmitted. In the case of a transmission confirmation screen on which a pseudo incident has occurred, when the transmission button 27 is pressed, a reconfirmation screen 31 is displayed, as described with reference to FIG. 5. When the cancellation button 28 is pressed, the training passing reporting screen described with reference to FIG. 9 is displayed.

As described above, when the transmission button 16 is pressed on the mail preparation screen 11 of FIG. 3, the transmission confirmation screen 21 is displayed. According to the embodiments, a pseudo incident is generated, and information that is different from information to be displayed (information including a pseudo error) is displayed.

As an example, "Estimate Answer (To ○○ Inc.)" has been input in the subject input field 13 of FIG. 3, and therefore "Estimate Answer (To ○○ Inc.)" is supposed to be displayed in the subject display field 23 of FIG. 4. However, in this example, a pseudo incident is generated, and the different subject "Estimate Answer (To ■■ Inc.)" is displayed in the subject display field 23.

As another example, "sannkakusannkaku@marumaru.co.jp" has been input in the transmission destination address input field 12 of FIG. 3, and therefore "sannkakusannkaku@ marumaru.co.jp" is supposed to be displayed in the external transmission destination address display field 25 of FIG. 4. However, in this example, a pseudo incident is generated, and the different transmission destination address "sannkakusannkaku@shikakushikaku.co.jp" is displayed in the external transmission destination address display field 25.

As yet another example, "estimate_○○Inc.zip" has been set in the file attachment field 14 of FIG. 3, and therefore "estimate_○○Inc.zip" is supposed to be displayed in the attached file display field 26 of FIG. 4. However, in this example, a pseudo incident is generated, and the different attached file name "estimate_■■Inc.pdf" is displayed in the attached file display field 26.

Figure 5:
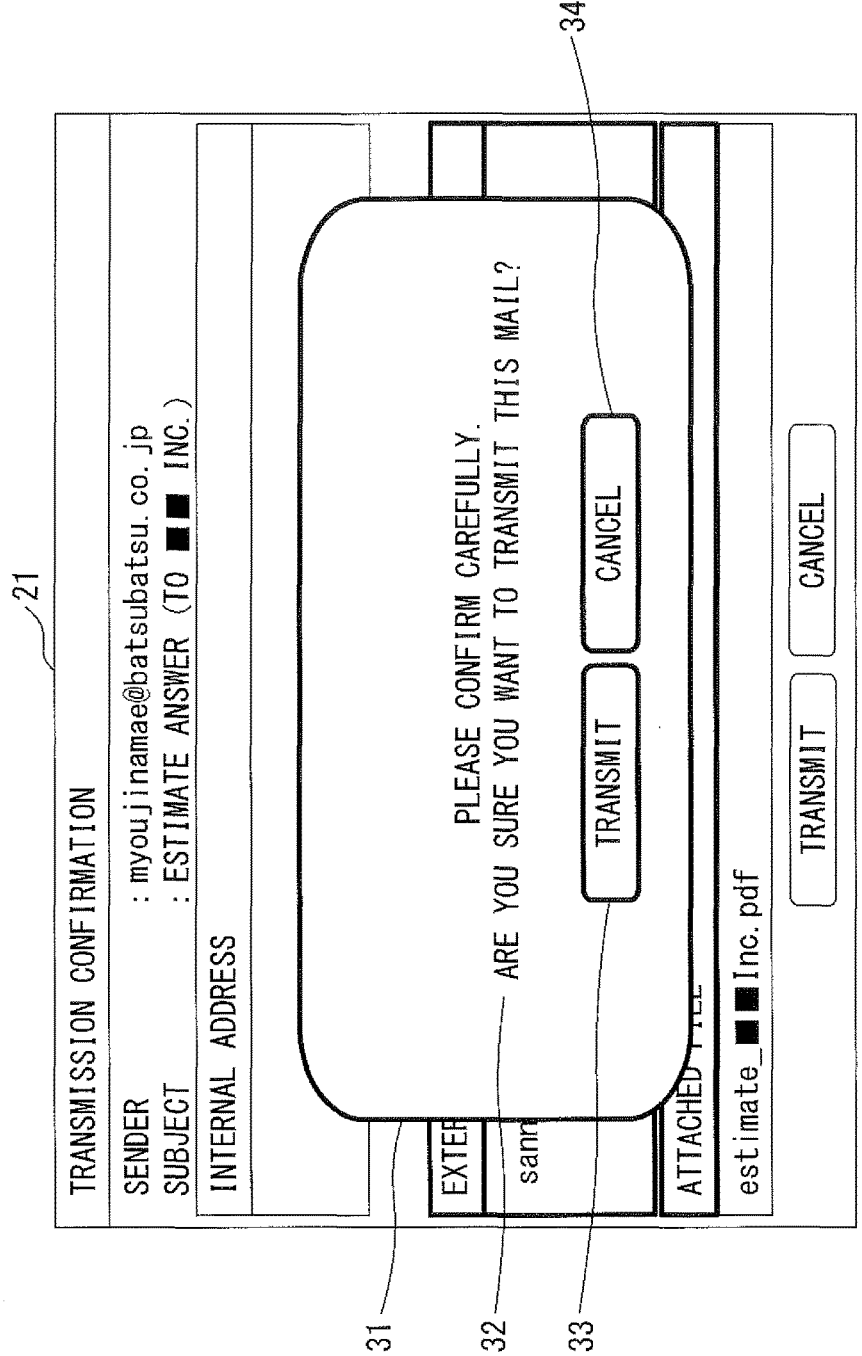
FIG. 5 illustrates a reconfirmation screen according to the embodiments.

FIG. 5 illustrates a reconfirmation screen according to the embodiments. A reconfirmation screen 31 is displayed when the transmission button 27 is pressed on the transmission confirmation screen 21 on which a pseudo incident has occurred, as described above.

The reconfirmation screen 31 includes a message 32, a transmission button 33, and a cancellation button 34. In the message 32, the message "Please confirm carefully. Are you sure you want to transmit this mail?" is displayed in order to prompt a user to perform reconfirmation. When the cancellation button 34 is pressed, the state described with reference to FIG. 6 is displayed.

Figure 7:
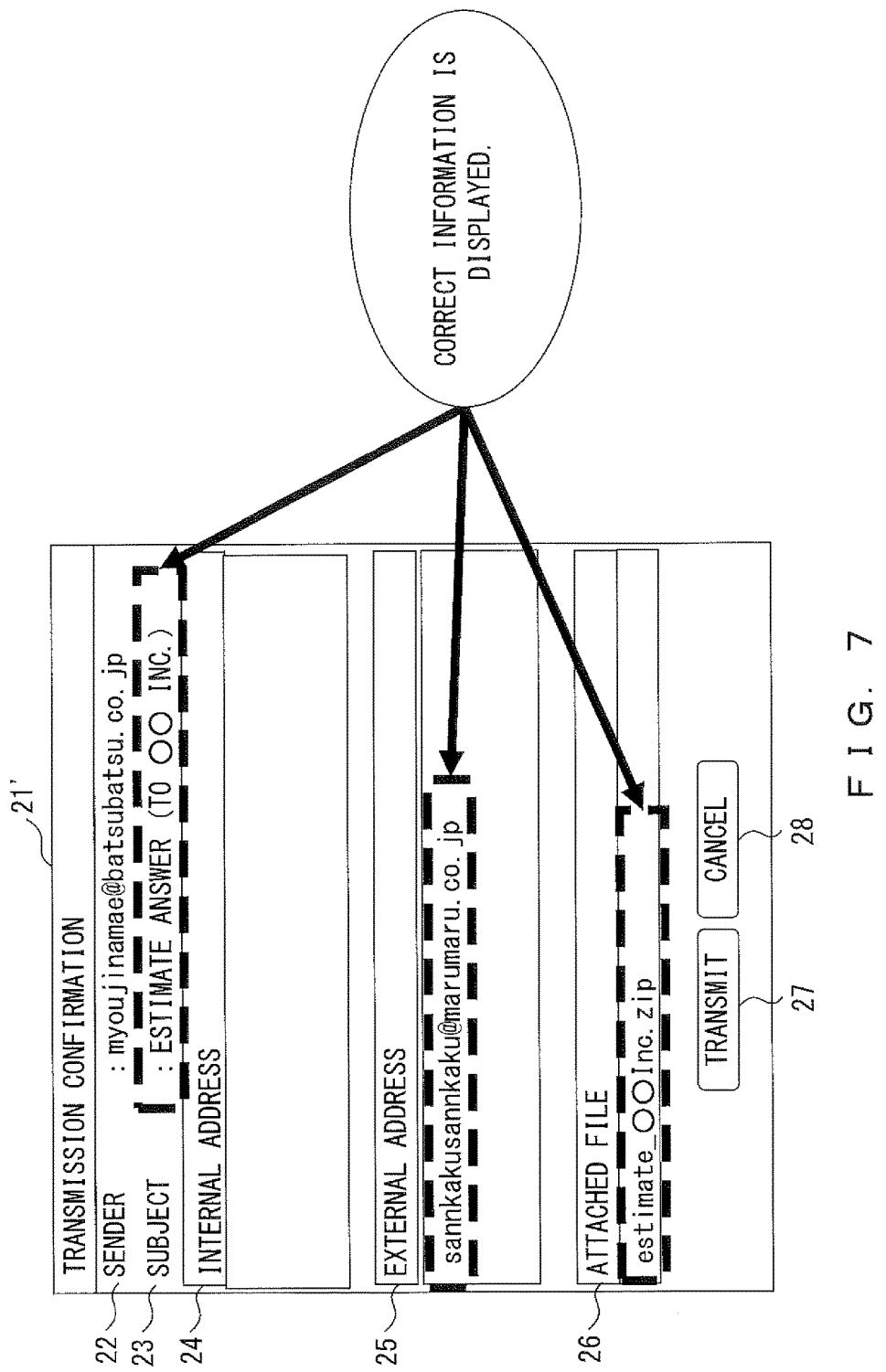
FIG. 7 illustrates a regular transmission confirmation screen.

FIG. 6 illustrates a training reporting screen according to the embodiments. FIG. 7 illustrates a regular transmission confirmation screen.

In FIG. 5, when the cancellation button 34 is pressed, a state in which a training reporting screen 35 has been popped up over the mail preparation screen 11 is displayed on a display, as illustrated in FIG. 6.

The training reporting screen 35 displays a message reporting that the screens illustrated in FIGS. 4 and 5 are screens for training. As an example, the training reporting screen 35 displays the message "The previously displayed transmission confirmation screen is a screen for 'training'. A transmission destination, a subject, and an attached file have been intentionally changed to wrong ones, but you 'transmitted' a mail. Please carefully confirm a transmission confirmation screen in the future".

When an "OK" button 36 is pressed, the training reporting screen 35 is closed, and a regular transmission confirmation screen 21' is displayed, as illustrated in FIG. 7. On the regular transmission confirmation screen 21', correct information is displayed in the subject display field 23, the external transmission destination address display field 25, and the attached file display field 26.

When the transmission button 33 is pressed on the reconfirmation screen 31 of FIG. 5, a mail illustrated in FIG. 8 is received.

FIG. 8 illustrates a received pseudo restraining mail according to the embodiments. When the transmission button 33 is pressed on the reconfirmation screen 31 of FIG. 5, a pseudo restraining mail 41 is received in a received mail box of a mailer. The pseudo restraining mail 41 is not actually transmitted from a transmission destination, and the pseudo restraining mail 41 is generated within a computer by a program according to the embodiments.

In a subject display field 42 of the pseudo restraining mail 41, a wrong subject that has been displayed in the subject display field 23 of FIG. 4 is displayed. In a received mail text display field 43, a message indicating that a pseudo transmission destination that is assumed to receive an erroneously transmitted mail issued a request to confirm the erroneously transmitted mail is displayed.

When a user that has pressed the transmission button 33 on the reconfirmation screen 31 of FIG. 5 receives the pseudo restraining mail 41, the user is startled, and is strongly impressed by erroneous transmission.

As described above, the pseudo restraining mail 41 enables a user to be startled and be strongly impressed.

When the cancellation button 28 is pressed on the transmission confirmation screen 21 of FIG. 4, the state described with reference to FIG. 9 is displayed.

FIG. 9 illustrates a training passing reporting screen according to the embodiments. When the cancellation button 28 is pressed on the transmission confirmation screen 21 of FIG. 4, a state in which a training passing reporting screen 51 has been popped up over the mail preparation screen 11 is displayed on a display.

The training passing reporting screen 51 displays a message reporting that the screens illustrated in FIGS. 4 and 5 are screens for security education training to prevent mail erroneous transmission and that the user passed the training. As an example, the training passing reporting screen 51 displays the message "You noticed well. The 'destination', 'subject', and 'attached file' have been intentionally changed to wrong ones on the previous transmission confirmation screen. You passed erroneous transmission training".

When an OK button 52 is pressed, the training passing reporting screen 51 is closed, and correct information that has been set by the user is displayed in the subject display field 23, the external transmission destination address display field 25, and the attached file display field 26, as illustrated in FIG. 7.

Figure 10:
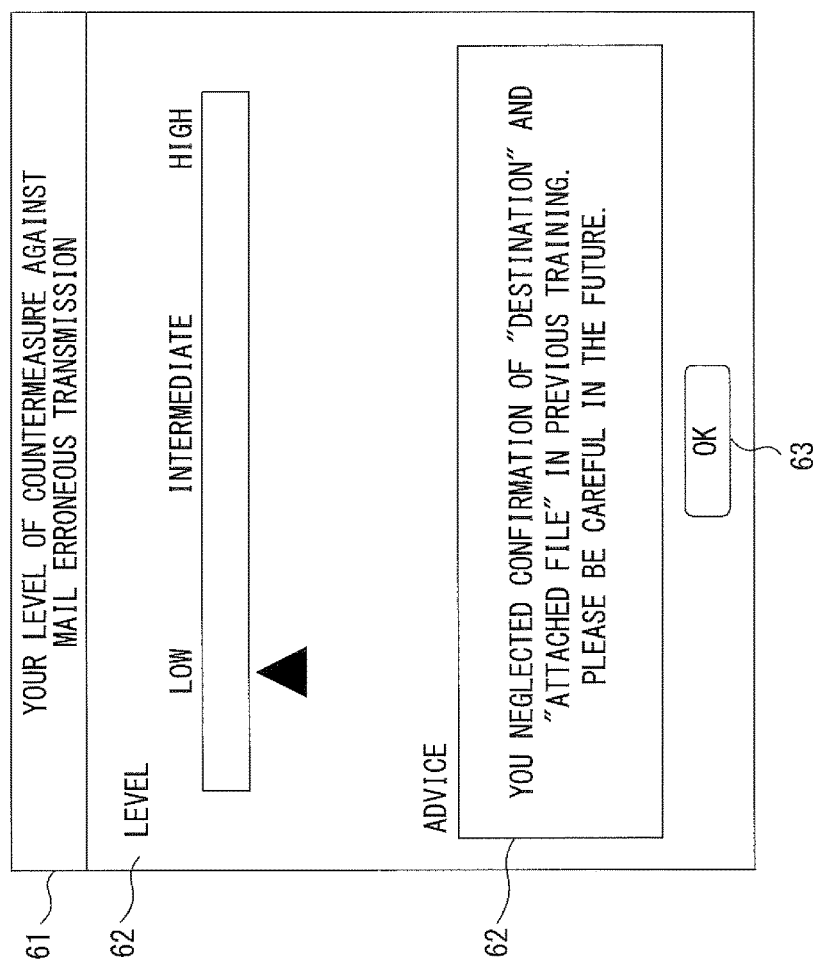
FIG. 10 illustrates an erroneous transmission countermeasure level reporting screen according to the embodiments.

FIG. 10 illustrates an erroneous transmission countermeasure level reporting screen according to the embodiments. An erroneous transmission countermeasure level reporting screen 61 is a screen that displays a user's level of a countermeasure against the erroneous transmission of a mail, and the erroneous transmission countermeasure level reporting screen 61 is displayed after security education training to prevent the erroneous transmission of a mail (FIGS. 4 to 9) is finished.

The erroneous transmission countermeasure level reporting screen 61 includes a level display field 62, an advice display field 62, and an OK button 63. In the level display field 62, a user's level of a countermeasure against the erroneous transmission of a mail is displayed. In the advice display field 62, an advice concerning security education training to prevent a mail from being erroneously transmitted that has been performed on the user is displayed. When the OK button 63 is pressed, the erroneous transmission countermeasure level reporting screen 61 is closed.

A mail misrepresentation method is described next.

Figure 11:
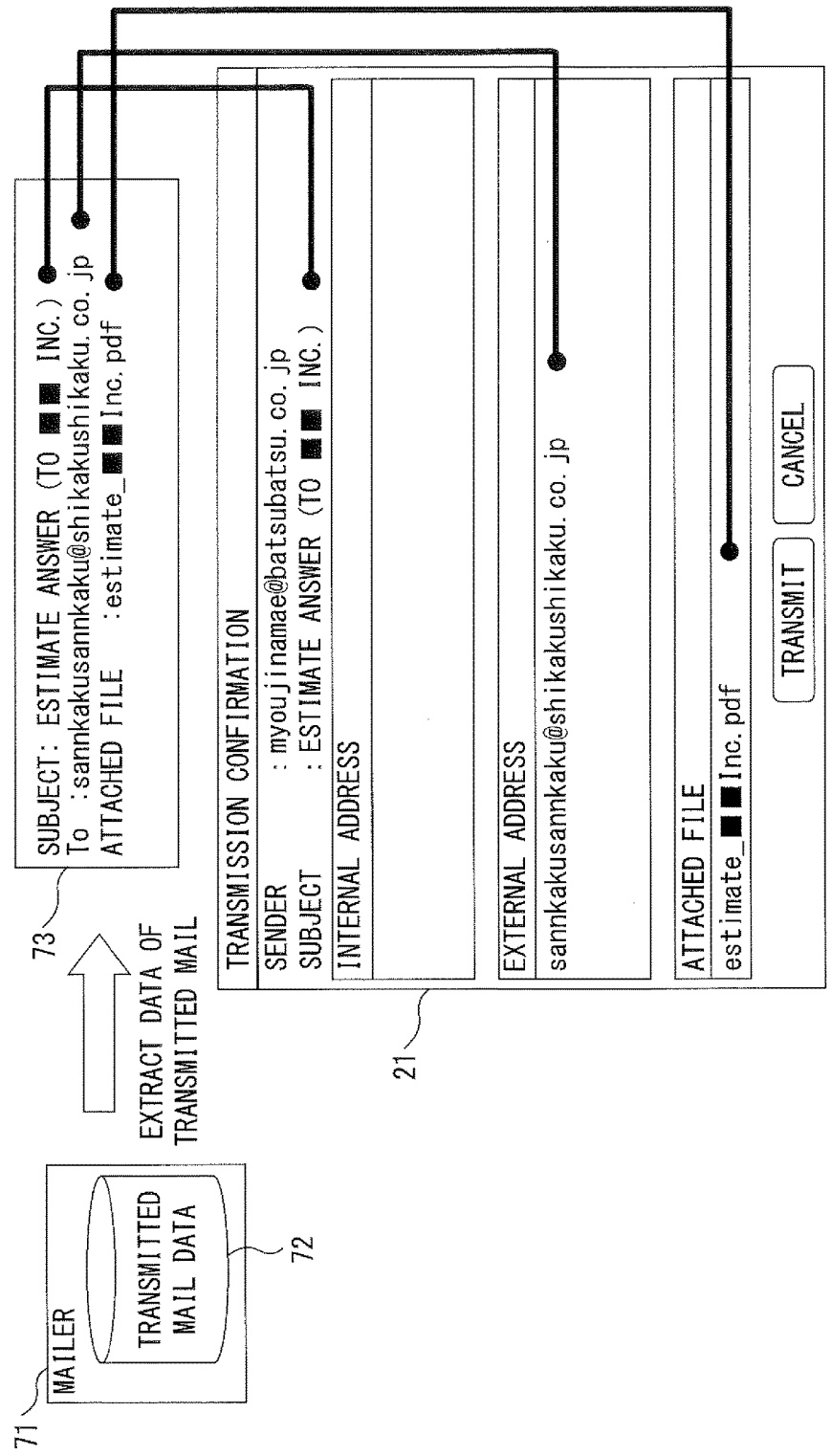
FIG. 11 is a diagram explaining a mail misrepresentation method according to the embodiments.

FIG. 11 is a diagram explaining a mail misrepresentation method according to the embodiments. As misrepresentation information used for security education training to prevent a mail from being erroneously transmitted, a subject, a destination (To), and the name of an attached file of a transmitted mail stored in a mail function are used. Information relating to a transmitted mail is used as misrepresentation information in order to prevent training performed on a user from becoming stereotyped, and to achieve a higher-level training.

If a mailer stores fixed data of a subject, a destination (To), the name of an attached file of a mail as misrepresentation information, information that is not familiar at all to a user is displayed. When training is repeated several times, the same misrepresentation information may be displayed. Namely, a user easily notices that training is performed. Accordingly, according to the embodiments, transmitted data is used as misrepresentation information.

On the mail preparation screen 11 of FIG. 3, a user finishes preparing a mail, and presses the transmission button 16. A control unit such as a central processing unit (CPU) that executes a program according to the embodiments extracts any transmitted mail data 73 from transmitted mail data 72 managed by a mailer 71. The control unit generates a pseudo incident according to the mail data 73, and displays a transmission confirmation screen 21 indicating the content different from the original, as illustrated in FIG. 4.

Namely, "Estimate Answer (To ○○ Inc.)" has been input in the subject input field 13 of FIG. 3, and therefore "Estimate Answer (To ○○ Inc.)" is supposed to be displayed in the subject display field 23 of FIG. 4. However, in this example, the control unit generates a pseudo incident according to the extracted transmitted mail data 73, and displays a different subject such as "Estimate Answer (To ■■ Inc.)" in the subject display field 23.

In addition, "sannkakusannkaku@marumaru.co.jp" has been input in the transmission destination address input field 12 of FIG. 3, and therefore "sannkakusannkaku@marumaru.co.jp" is supposed to be displayed in the external transmission destination address display field 25 of FIG. 4. However, in this example, the control unit generates a pseudo incident according to the extracted transmitted mail data 73, and displays a different transmission destination address such as "sannkakusannkaku@shikakushikaku.co.jp" in the external transmission destination address display field 25.

Further, as an example, "estimate_○○Inc.zip" has been set in the file attachment field 14 of FIG. 3, and therefore, "estimate_○○Inc.zip" is supposed to be displayed in the attached file display field 26 of FIG. 4. However, in this example, the control unit generates a pseudo incident according to the extracted transmitted mail data 73, and displays a different name of an attached file such as "estimate_■■Inc.pdf" in the attached file display field 26.

Figure 12:
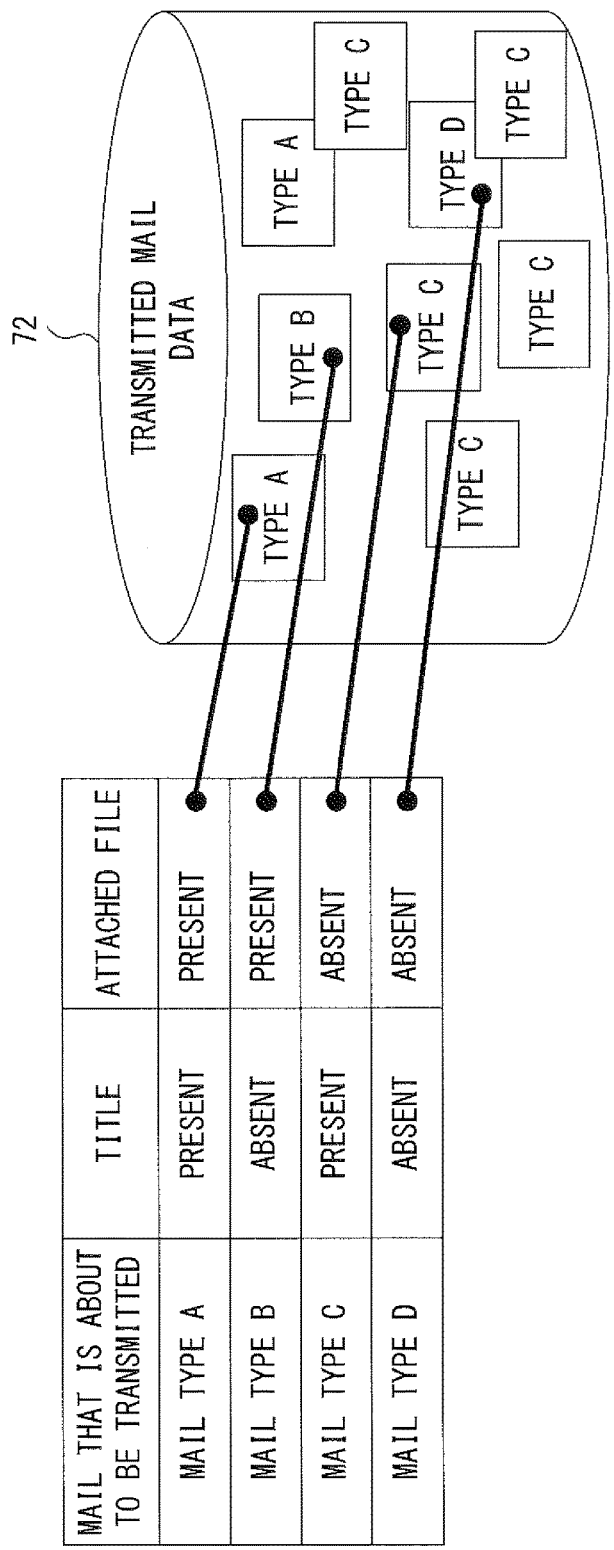
FIG. 12 is a diagram explaining transmitted mail data according to the embodiments.

FIG. 12 is a diagram explaining transmitted mail data according to the embodiments. Examples of the type of a mail of the transmitted mail data include a mail type A, a mail type B, a mail type C, and a mail type D.

The mail type A is a type that includes a title (subject) of a mail and an attached file. The mail type B is a type that does not include a title (subject) of a mail but includes an attached file. The mail type C is a type that includes a title (subject) of a mail but does not include an attached file. The mail type D is a type that does not include a title (subject) of a mail or an attached file.

According to the embodiments, any mail may be extracted, for example, at random from among the transmitted mail data 72 managed as described above, and may obtain a subject, a transmission destination, or the name of an attached file of the extracted mail so as to use it as misrepresentation information.

Alternatively, a transmitted mail having the same pattern as the pattern of a mail that is about to be transmitted may be extracted from the transmitted mail data 72, and may obtain a subject, a transmission destination, or the name of an attached file of the extracted mail so as to use it as misrepresentation information.

FIG. 13A is a diagram explaining a transmission confirmation screen misrepresentation item according to the embodiments. FIG. 13B is a diagram explaining a mail erroneous transmission countermeasure level according to the embodiments.

Examples of a misrepresentation item on the transmission confirmation screen 21 of FIG. 13A include "subject misrepresentation", "destination misrepresentation", "attached file name misrepresentation", and "attached file extension misrepresentation".

Examples of "subject misrepresentation" include misrepresentation in which a subject that has been input on the mail preparation screen 11 is changed to a subject including typos or omissions, and misrepresentation in which the subject that has been input on the mail preparation screen 11 is changed to a subject of a mail that has been previously transmitted.

Examples of "destination misrepresentation" include misrepresentation in which a mechanically generated destination is added to a destination that has been input on the mail preparation screen 11, misrepresentation in which, when there are plural input destinations, any of the plural input destinations is deleted, and misrepresentation in which an input destination is changed to a destination of a mail that has been previously transmitted.

Examples of "attached file name misrepresentation" include misrepresentation in which the name of an attached file is changed to a mechanically generated name of a file, and misrepresentation in which the name of an attached file is changed to the name of a file attached to a mail that has been previously transmitted.

Examples of "attached file extension misrepresentation" include the following. As an example, when a Portable Document Format (PDF) file is attached, an icon of the attached file is changed to an icon of document preparing software "Word" of Microsoft Corporation, and an extension is changed to "xls". Alternatively, an icon of an attached file is changed to an icon of spreadsheet software "Excel", and an extension is changed to "xls".

As a smaller number of items are misrepresented, a user is less likely to notice misrepresentation. Accordingly, as illustrated in FIG. 13B, a mail erroneous transmission countermeasure level is set according to the number of misrepresented items on the transmission confirmation screen 21.

At a low level, misrepresentation is set in all three items of the items "subject", "destination", and "attached file". At an intermediate level, misrepresentation is set in two items of the items "subject", "destination", and "attached file". At a high level, misrepresentation is set in one item of the items "subject", "destination", and "attached file".

Level determination criteria for a pseudo incident are satisfied, if a user notices at least one of one or more misrepresentations that have been set at a level.

Figure 14C:
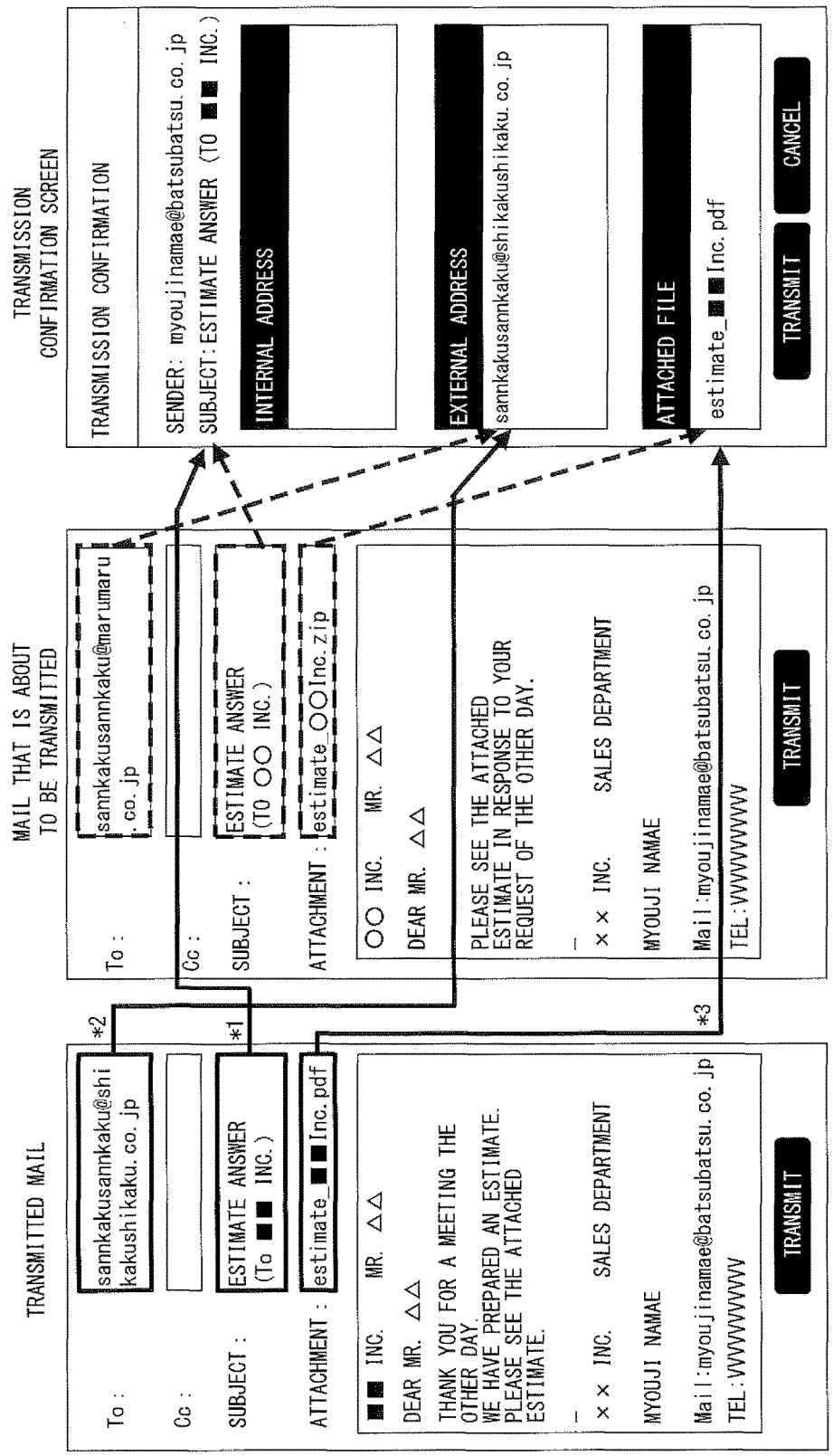
FIG. 14C illustrates an example in which misrepresentation information based on a transmitted mail is displayed on a transmission confirmation screen that corresponds to a mail that is about to be transmitted according to the embodiments.

FIG. 14A illustrates a low mail erroneous transmission countermeasure level illustrated in FIG. 13B, and FIG. 14B illustrates a misrepresentation method that corresponds to the low level. FIG. 14C illustrates an example according to the embodiments in which misrepresentation information based on a transmitted mail is displayed on a transmission confirmation screen that corresponds to a mail that is about to be transmitted. A case is described below in which "subject misrepresentation", "destination misrepresentation", and "attached file name misrepresentation" are performed at the low level, as illustrated in FIG. 14A.

As "subject misrepresentation", a subject of a mail that is about to be transmitted is changed to a subject of a mail that has been previously transmitted, as illustrated in FIGS. 14B and 14C (*1).

As "destination misrepresentation", a destination of the mail that is about to be transmitted is changed to a destination of a mail that has been previously transmitted, as illustrated in FIGS. 14B and 14C (*2).

As "attached file name misrepresentation", the name of a file attached to the mail that is about to be transmitted is changed to the name of a file attached to a mail that has been previously transmitted, as illustrated in FIGS. 14B and 14C (*3).

Note that only information on the transmission confirmation screen is replaced and that the text of a mail is not changed.

Specific examples of the embodiments are described next.

Figure 15:
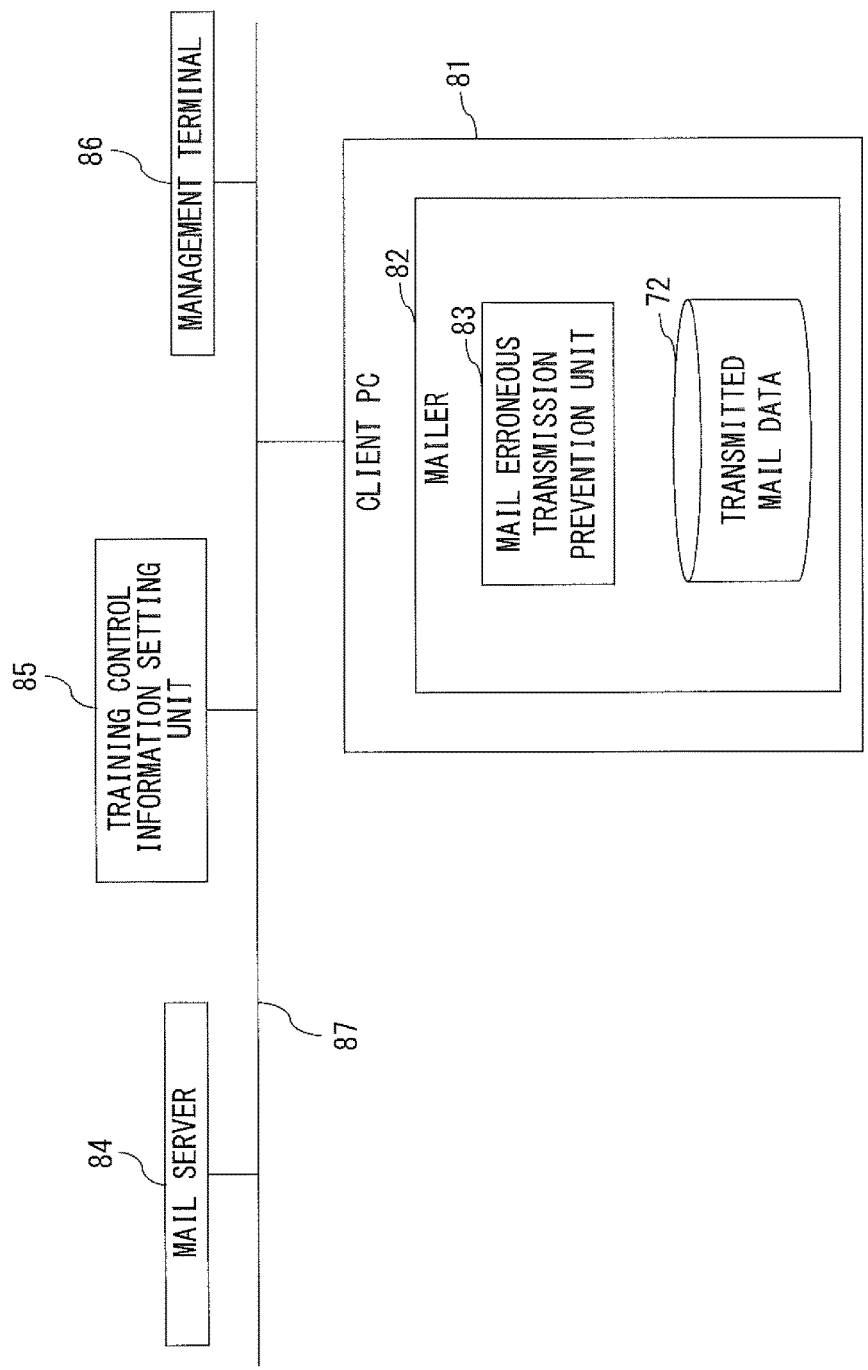
FIG. 15 illustrates a system configuration in an example of the embodiments.

FIG. 15 illustrates a system configuration in an example of the embodiments. In this system, a client PC 81, a mail server 84, a training control information setting unit 85, and a management terminal 86 are communicably connected to each other via a network 87.

The client PC 81 is a computer used by a user. The mail server 84 manages transmission or reception of a mail via the network 87. The training control information setting unit 85 sets whether a misrepresentation mail function for training according to the embodiments is enabled, or manages setting of information relating to a misrepresentation mail. The management terminal 86 manages information that is set by the training control information setting unit 85.

A mailer 82 is installed onto the client PC 81. A CPU of the client PC 81 functions as a mail erroneous transmission prevention unit 83 by executing the mailer 82. The mail erroneous transmission prevention unit 83 is described with reference to FIGS. 16 and 17. The transmitted mail data 72 has been described with reference to FIG. 12, and the description thereof is omitted here.

Figure 16:
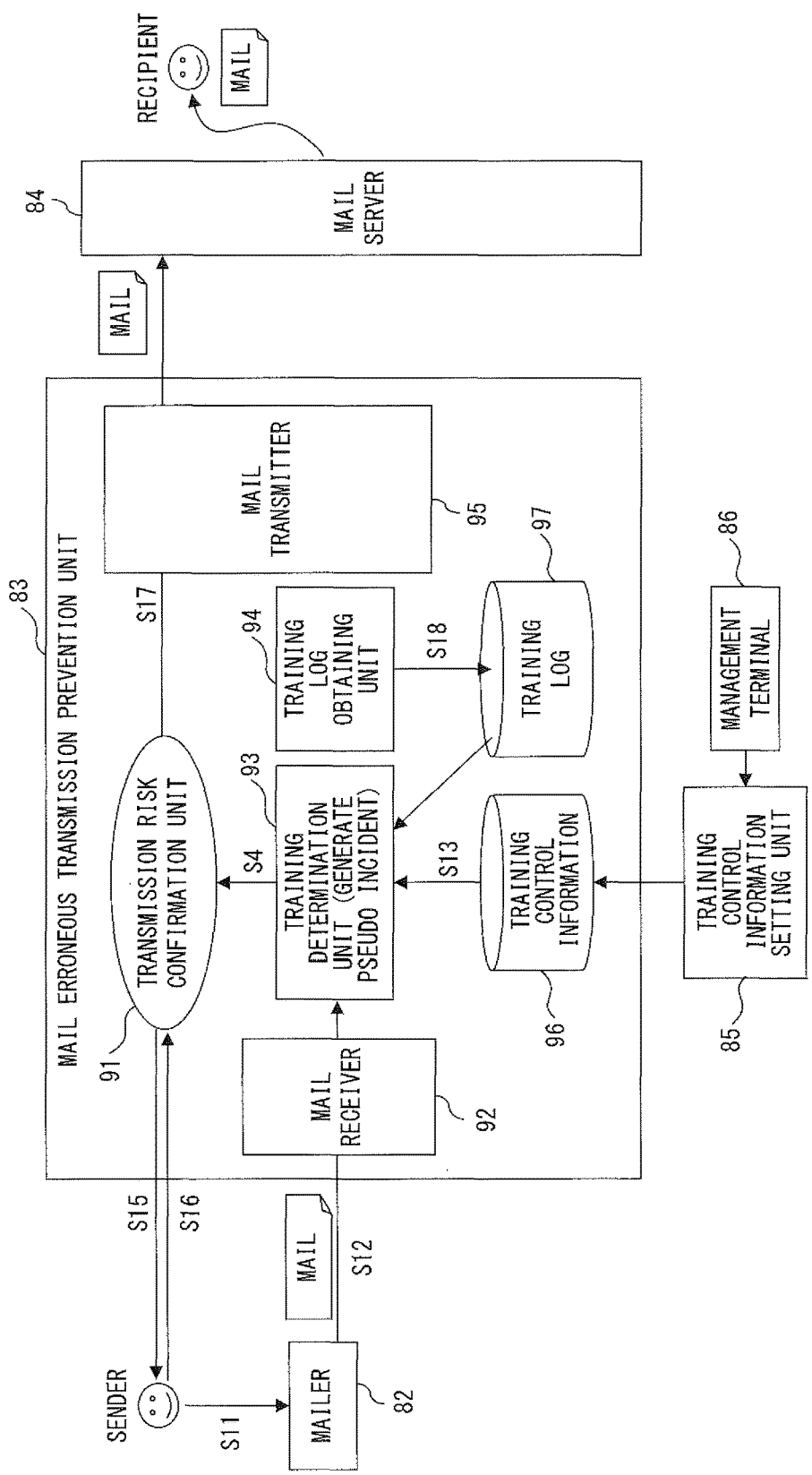
FIG. 16 illustrates a mail erroneous transmission prevention unit in an example of the embodiments.

FIG. 16 illustrates a mail erroneous transmission prevention unit in an example of the embodiments. As an example, it is assumed that the mail erroneous transmission prevention unit 83 is a Simple Mail Transfer Protocol (SMTP) proxy model that intercepts (snatches) SMTP communication between the mailer 82 and the mail server 84.

The mail erroneous transmission prevention unit 83 includes a transmission risk confirmation unit 91, a mail receiver 92, a training determination unit 93, a training log obtaining unit 94, and a mail transmitter 95, and the mail erroneous transmission prevention unit 83 performs processing by using training control information 96 and a training log 97. The training control information 96 is information that is set by the training control information setting unit 85. The training log 97 is a log relating to a user's operation on the screens illustrated in FIGS. 4 to 9. These respective functions are described.

A user prepares a mail by using the mail preparation screen 11 of the mailer 82, and presses the transmission button 16 (S11). The mailer 82 transmits a mail (S12), but the mail is intercepted by the mail erroneous transmission prevention unit 83, and is received by the mail receiver 92.

The mail receiver 92 transfers the received mail to the training determination unit 93. The training determination unit 93 generates a pseudo incident in the received mail on the basis of the training control information 96 (S13).

The transmission risk confirmation unit 91 displays the transmission confirmation screen 21 (FIG. 4) on the basis of the pseudo incident generated by the training determination unit 93 (S15). The user performs a screen operation on the displayed transmission confirmation screen 21 (FIG. 4). The transmission risk confirmation unit 91 displays the reconfirmation screen 31 (FIG. 5), the training reporting screen 35 (FIG. 6), the pseudo restraining mail 41 (FIG. 8), the training passing reporting screen 51 (FIG. 9), and the erroneous transmission countermeasure level reporting screen 61 (FIG. 10) in accordance with the screen operation performed by the user.

The training log obtaining unit 94 obtains the training log 97 relating to the screen operation that the user has performed on a screen display based on the pseudo incident (S18). The training determination unit 93 determines an erroneous transmission countermeasure level to be displayed on the erroneous transmission countermeasure level reporting screen 61 (FIG. 10) on the basis of the training log 97.

After training is finished, the transmission risk confirmation unit 91 transfers the mail received in S12 to the mail transmitter 95 (S17). The mail transmitter 95 transmits the mail to the mail server 84.

FIG. 17 illustrates a mail erroneous transmission prevention unit in another example of the embodiments. A case in which the mail erroneous transmission prevention unit 83 is an SMTP proxy model has been described with reference to FIG. 16, but a mail erroneous transmission prevention unit 83' as an extension function of the mailer 82 is described with reference to FIG. 17. Stated another way, the mail erroneous transmission prevention unit 83' of FIG. 17 is extensible such that the mail erroneous transmission prevention unit 83' is installed as an add-in model (an extension function) of the mailer 82. In this case, mail transmission is not performed by the mail erroneous transmission prevention unit 83', but is performed by the mailer 82.

Unlike FIG. 16, the mail erroneous transmission prevention unit 83' in FIG. 17 does not include the mail receiver 92 and the mail transmitter 95. A mail preparation user interface (UI) 98 and the mail transmitter 95' of the mailer 82 are functions that the mailer 82 originally has, and the mail preparation UI 98 and the mail transmitter 95' are illustrated for convenience of explanation.

A user prepares a mail by using the mail preparation UI 98 (the mail preparation screen 11), and presses the mail transmission button 16 (S11). The mail preparation UI 98 transfers the mail to the mail erroneous transmission prevention unit 83 (the training determination unit 93).

The training determination unit 93 generates a pseudo incident in the received mail on the basis of the training control information 96 (S13).

The transmission risk confirmation unit 91 displays the transmission confirmation screen 21 (FIG. 4) on the basis of the pseudo incident generated by the training determination unit 93 (S15). The user performs a screen operation on the displayed transmission confirmation screen 21 (FIG. 4) (S16). The transmission risk confirmation unit 91 displays the reconfirmation screen 31 (FIG. 5), the training reporting screen 35 (FIG. 6), the pseudo restraining mail 41 (FIG. 8), the training passing reporting screen 51 (FIG. 9), and the erroneous transmission countermeasure level reporting screen 61 (FIG. 10) in accordance with the screen operation performed by the user.

The training log obtaining unit 94 obtains the training log 97 relating to the screen operation that the user has performed on a screen display based on the pseudo incident (S18). The training determination unit 93 determines an erroneous transmission countermeasure level to be displayed on the erroneous transmission countermeasure level reporting screen 61 (FIG. 10) on the basis of the training log 97.

After training is finished, the transmission risk confirmation unit 91 reports to the mail preparation UI 98 that training has been finished (S17'). The mail preparation UI 98 transfers the mail prepared by the user to the mail transmitter 95' (S19). The mail transmitter 95' transmits the mail to the mail server 84 (S20).

Figure 18:
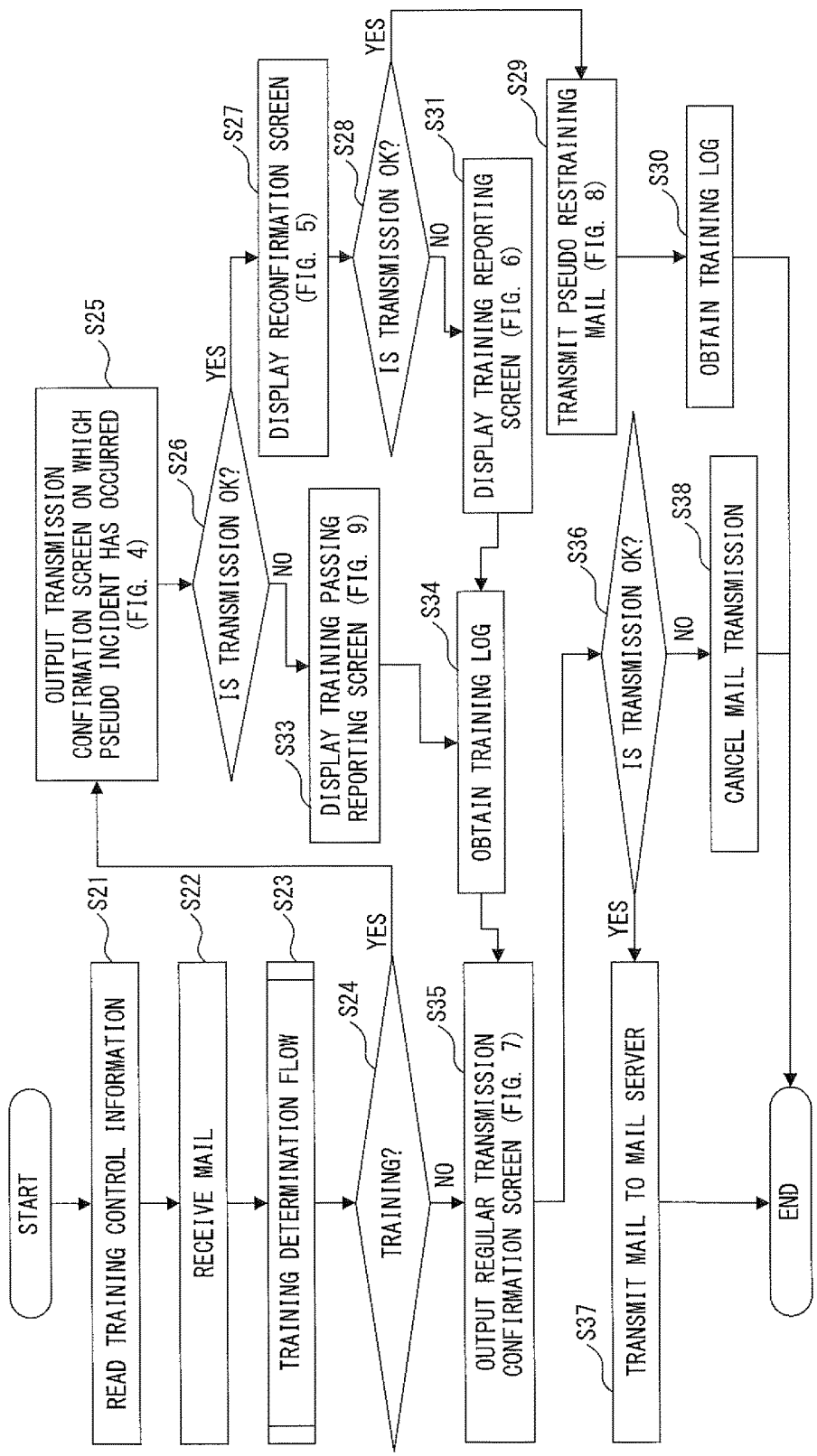
FIG. 18 illustrates an entire processing flow in an example of the embodiments.

FIG. 18 illustrates an entire processing flow in an example of the embodiments. A processing flow in the configuration illustrated in FIG. 16 is described with reference to FIG. 18, for convenience of explanation, but a similar processing flow is applied to the configuration illustrated in FIG. 17.

First, the training determination unit 93 reads the training control information 96 (S21). When a user prepares a mail and presses the mail transmission button 16, the mail receiver 92 receives the mail (S22).

The training determination unit 93 performs a training determination flow (S23). In the training determination flow, whether training will be performed on the user is determined. The process of S23 is described in detail with reference to FIG. 19.

As a result of processing (S23) of the training determination flow, when it is determined that training will be performed on the user ("YES" in S24), the transmission risk confirmation unit 91 displays the transmission confirmation screen 21 (FIG. 4) on which a pseudo incident has occurred (S25).

In S25, the transmission risk confirmation unit 91 reads a security level of the user from the training control information 96 when it is determined that training will be performed on the user. The transmission risk confirmation unit 91 generates misrepresentation information in one or more items ("subject", "destination", and "attached file name") in accordance with the read security level of the user, as described with reference to FIGS. 13A, 13B, and 14A to 14C. The transmission risk confirmation unit 91 replaces items that correspond to the generated misrepresentation information from among items to be displayed on a regular transmission confirmation screen with the misrepresentation information. The transmission risk confirmation unit 91 displays the transmission confirmation screen 21 including the misrepresentation information.

When the transmission button 27 is pressed on the transmission confirmation screen 21 (FIG. 4) ("YES" in S26), the transmission risk confirmation unit 91 displays the reconfirmation screen 31 (FIG. 5) (S27). When the transmission button 33 is pressed on the reconfirmation screen 31 ("YES" in S28), the transmission risk confirmation unit 91 transmits the pseudo restraining mail 41 (FIG. 8) to the mailer 82 (S29). The training log obtaining unit 94 obtains a training log indicating the content of the user's operations in S26 and S28 (S30).

When the cancellation button 34 is pressed on the reconfirmation screen 31 (FIG. 5) ("NO" in S28), the transmission risk confirmation unit 91 displays the training reporting screen 35 (FIG. 6) (S31). The training log obtaining unit 94 obtains a training log indicating the content of the user's operations in S26 and S28 (S34).

When the cancellation button 28 is pressed on the transmission confirmation screen 21 (FIG. 4) ("NO" in S26), the transmission risk confirmation unit 91 displays the training passing reporting screen 51 (FIG. 9) (S33). The training log obtaining unit 94 obtains a training log indicating the content of the user's operation in S26 (S34).

As a result of processing of the training determination flow, when it is determined in S24 that training will not be performed on the user ("NO" in S24), or after the process of S34 is performed, the transmission risk confirmation unit 91 displays a regular transmission confirmation screen 21 (FIG. 7) (S35).

When the transmission button 27 is pressed on the transmission confirmation screen 21 (FIG. 7) ("YES" in S36), the mail transmitter 95 transmits the mail to the mail server 84 (S37). When the cancellation button 28 is pressed on the transmission confirmation screen 21 (FIG. 7) ("NO" in S36), the mailer 82 cancels mail transmission (S38).

Figure 19:
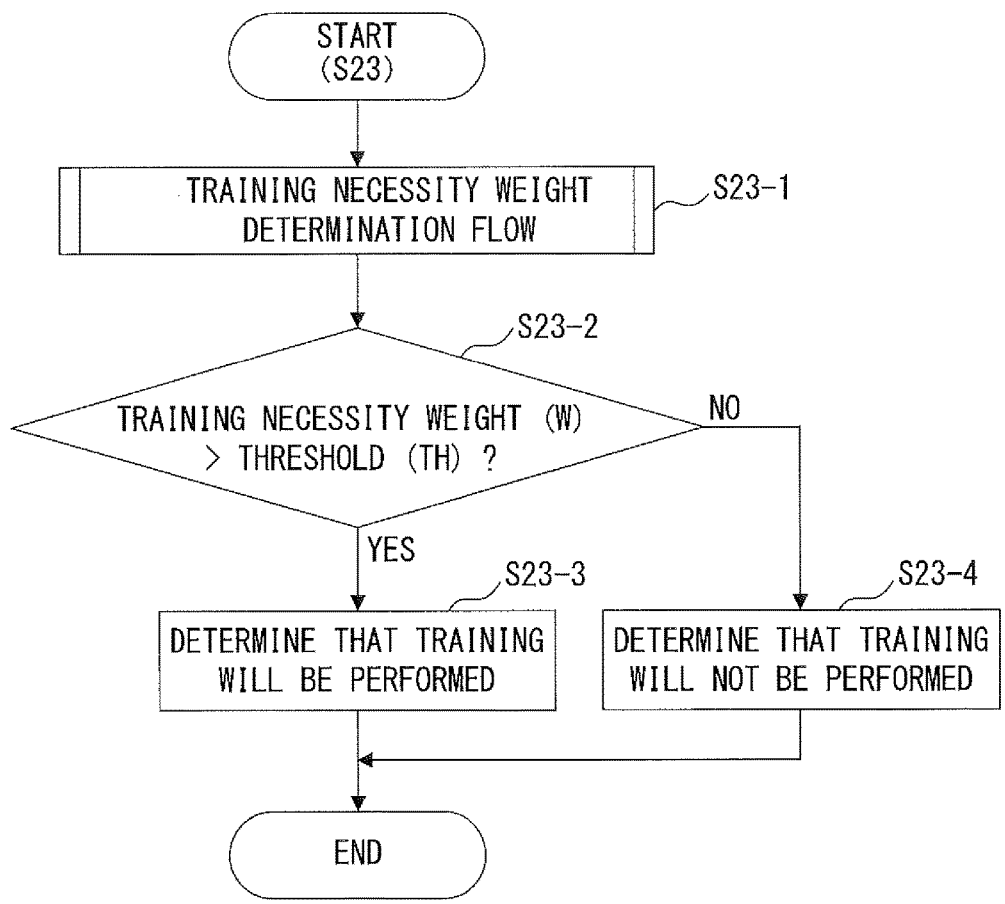
FIG. 19 illustrates a detailed flow of a training determination flow (S23)

FIG. 19 illustrates a detailed flow of the training determination flow (S23). The training determination unit 93 performs a training necessity weight determination process (S23-1). The training determination unit 93 generally compares a weight (W) with a fixed threshold (TH), and determines necessity of training in a training determination process. The weight (W) is described in detail with reference to FIG. 20.

As an extensive determination process, processing can be extended by inserting a process for dynamically calculating a risk degree from a past training result or past transmitted mail information and for changing a threshold (TH) according to the calculated risk degree. In addition, processing can be extended by inserting a determination process for forcibly performing training when arbitrary conditions are satisfied regardless of a result of comparing the weight (W) with the threshold (TH). The process of S23-1 is described in detail with reference to FIG. 20.

When a training necessity weight (W)>a threshold (TH) is established ("YES" in S23-2), the training determination unit 93 determines that training will be performed (S23-3). When a training necessity weight (W)≥a threshold (TH) is established ("NO" in S23-2), the training determination unit 93 determines that training will not be performed (S23-4).

Figure 20:
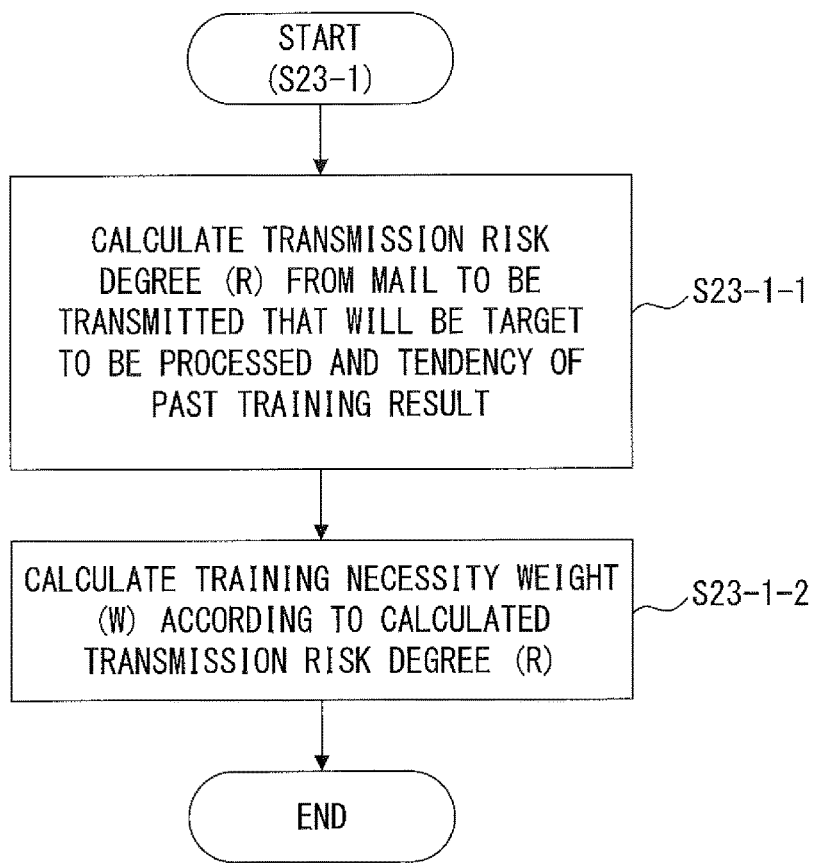
FIG. 20 illustrates a detailed flow of a training necessity weight determination processing flow (S23-1)

FIG. 20 illustrates a detailed flow of a training necessity weight determination processing flow (S23-1). The training determination unit 93 calculates a transmission risk degree (R) from a mail to be transmitted that will be a target to be processed and a tendency of a past training result (S23-1-1).

The training determination unit 93 calculates, for example, a transmission risk degree $R_i$ ($1 \leq i \leq n$ (n is the number of risk items), and $R_i$=a numerical value that is greater than or equal to 1.0) for each of the risk items (risk calculation rules below are examples, risk calculation rules are not limited to the rules below, and other rules can be implemented).

Risk item 1: the type of a destination of a mail (as an example, $R1$=+2.0 when a mail address outside a company is included, and $R1$=+1 when the mail address outside the company is not included)

Risk item 2: existence of an attached file (as an example, $R2$=+2.0 when a file is attached, and $R2$=+1.0 when a file is not attached)

Risk item 3: a combination of a destination domain, a mail title, a mail text, and the name of an attached file (as an example, $R3$=+2.0 when a mail is about to be transmitted to the domain "aaa.com", and a keyword having a high risk of erroneous transmission (such as a company secret) is included)

Risk item 4: a time period after training was previously performed (a length of a cycle of training) (as an example, $R4$=+1.0 when it is determined from a training log that a prescribed time period has passed after training was previously performed)

Risk item 5: a past training result (as an example, $R5$=+1.0 when it is determined from a training log that the number of failures in the most recent training is greater than or equal to a prescribed number)

The training determination unit 93 multiplies a transmission risk degree $R_i$ for each of the risk items above by a weight $W_i$ that has been set according to each of the risk items, and calculates the sum of values of (transmission risk degree $R_i$*weight $W_i$) as a training necessity weight (W) (S23-1-2).

$$\text{Training Necessity Weight}(W) = R1*W1 + R2*W2 + \ldots + Rn*Wn$$

As an example, it is assumed that 2.0 (a risk item having a high degree of importance), 1.5 (a risk item having an intermediate degree of importance), and 1.0 (a risk item having a low degree of importance) are respectively set as weights Wi by which respective transmission risk degrees are multiplied. In the case of the risk item having a high degree of importance, a weight is twice the weight in the case of the risk item having a low degree of importance, and necessity of training is strictly determined.

The risk calculation rule above may have been defined in advance by an administrator, for example, in the training control information (a policy file) 96.

Figure 21:
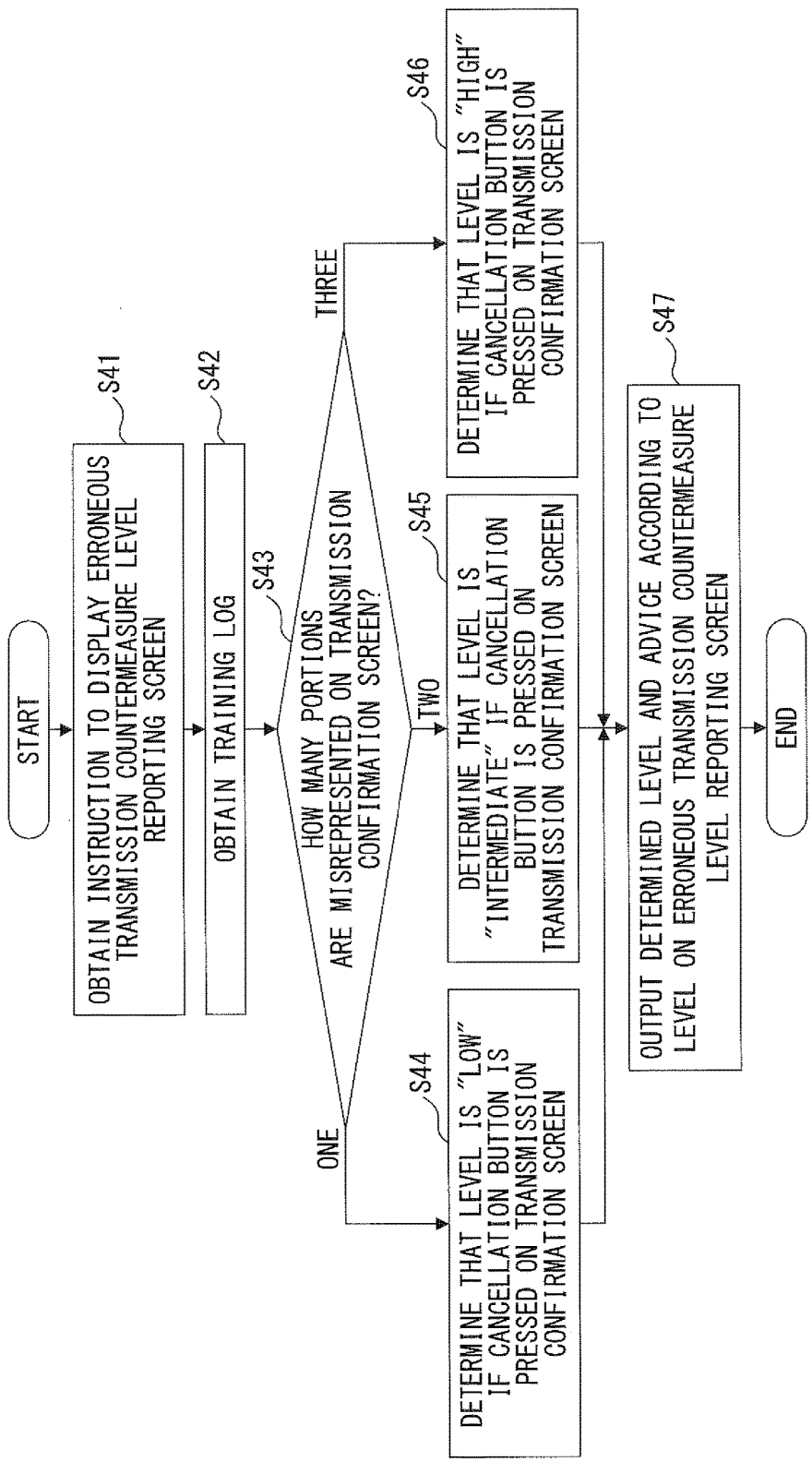
FIG. 21 illustrates a flow of displaying an erroneous transmission countermeasure level reporting screen in an example of the embodiments.

FIG. 21 illustrates a flow of displaying an erroneous transmission countermeasure level reporting screen in an example of the embodiments. When a user performs an operation to issue an instruction to display the erroneous transmission countermeasure level reporting screen 61 (S41), the transmission risk confirmation unit 91 reads the training log 97 (S42).

The transmission risk confirmation unit 91 determines from the training control information 96 how many portions have been misrepresented on the transmission confirmation screen 21 (S43). The training control information 96 includes information indicating how many items have been misrepresented or whether items have been misrepresented on the transmission confirmation screen 21.

When three portions have been misrepresented on the transmission confirmation screen 21, the transmission risk confirmation unit 91 performs the following processing. Namely, when the transmission risk confirmation unit 91 refers to the training log 97 so as to determine that a cancellation button has been pressed on the transmission confirmation screen 21, the transmission risk confirmation unit 91 determines that a user's level of a mail erroneous transmission countermeasure is "low" (S44).

When two portions have been misrepresented on the transmission confirmation screen 21, the transmission risk confirmation unit 91 performs the following processing. Namely, when the transmission risk confirmation unit 91 refers to the training log 97 so as to determine that a cancellation button has been pressed on the transmission confirmation screen 21, the transmission risk confirmation unit 91 determines that a user's level of a mail erroneous transmission countermeasure is "intermediate" (S45).

When one portion has been misrepresented on the transmission confirmation screen 21, the transmission risk confirmation unit 91 performs the following processing. Namely, when the transmission risk confirmation unit 91 refers to the training log 97 so as to determine that a cancellation button has been pressed on the transmission confirmation screen 21, the transmission risk confirmation unit 91 determines that a user's level of a mail erroneous transmission countermeasure is "high" (S46).

The transmission risk confirmation unit 91 outputs the level determined in S44 to S46 and an advice according to the level on the erroneous transmission countermeasure level reporting screen 61.

Consequently, an effect of implementation of education or a countermeasure to prevent a mail from being erroneously transmitted (to confirm a destination, an attached file, or the like) can be automatically measured.

In this example, a message relating to a pseudo incident is displayed on a transmission confirmation screen on which part or all of targets on which transmission confirmation is performed have been misrepresented at the time of transmitting a mail, in accordance with a result of selecting whether transmission will be performed, and transmission confirmation can be prevented from becoming stereotyped.

Figure 22:
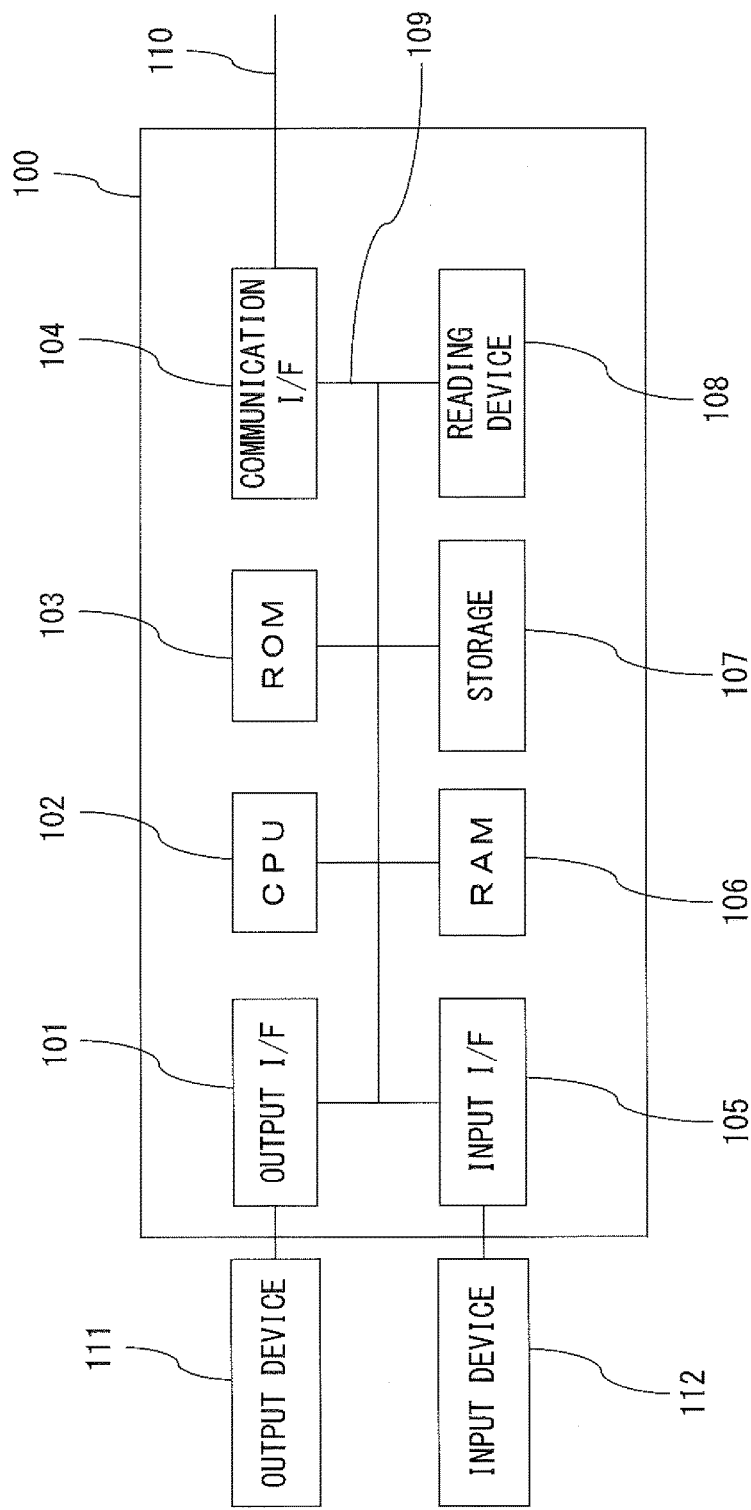
FIG. 22 is an example of a block diagram illustrating the configuration of a hardware environment of a computer that executes a program according to the embodiments.

FIG. 22 is an example of a block diagram illustrating the configuration of a hardware environment of a computer that executes a program according to the embodiments. A computer 100 functions as the client PC 81. The computer 100 is configured of a CPU 102 (a processor), a ROM 103, a RAM 106, a communication I/F 104, a storage 107, an output I/F 101, an input I/F 105, a reading device 108, a bus 109, an output device 111, and an input device 112.

The CPU refers to a central processing unit. The ROM refers to a read only memory. The RAM refers to a random access memory. The I/F refers to an interface. The bus 109 is connected to the CPU 102, the ROM 103, the RAM 106, the communication I/F 104, the storage 107, the output I/F 101, the input I/F 105, and the reading device 108. The reading device 108 is a device that reads a portable recording medium. The output device 111 is connected to the output I/F 101. The input device 112 is connected to the input I/F 105.

As the storage 107, various forms of storages, such as a hard disk, a flash memory, or a magnetic disk, can be used. In the storage 107 or the ROM 103, a program according to the embodiments for causing the CPU 102 to function as the first output control unit 2, the second output control unit 3, and the visualization unit 4 is stored. More specifically, a program according to the embodiments for causing the CPU 102 to function as the mail erroneous transmission prevention unit 83 or 83' is stored. The RAM 106 or the storage 107 functions as the storing unit 5.

The CPU 102 reads the program according to the embodiments from the storage 107 or the ROM 103, and executes the program.

The communication I/F 104 is an interface, such as a port, that is used to perform connection to a network and to communicate with other devices.

A program for implementing the processing described in the embodiments above may be provided from a program provider via a communication network 110 and the communication I/F 104, and may be stored, for example, in the storage 107. The program for implementing the processing described in the embodiments above may be stored in a portable storage medium that is commercially available and is distributed. In this case, the portable storage medium may be installed onto the reading device 108, and the program may be read and executed by the CPU 102. As the portable storage medium, various forms of storage media, such as a Compact Disk Read Only Memory (CD-ROM), a flexible disk, an optical disk, a magneto-optical disk, an Integrated Circuit (IC) card, a Universal Serial Bus (USB) memory device, or a semiconductor memory card, can be used. Programs stored in the storage media above are read by the reading device 108.

As the input device 112, a keyboard, a mouse, an electronic camera, a web camera, a microphone, a scanner, a sensor, a tablet, a touch panel, or the like can be used. As the output device 111, a display device (a display), a printer, a speaker, or the like can be used.

The network 110 may be the Internet, a Local Area Network (LAN), a Wide Area Network (WAN), a leased line communication network, a wired communication network, or a wireless communication network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an electronic mail erroneous transmission prevention supporting program for causing a computer to execute a process comprising:
   calculating a risk degree in accordance with a risk calculation rule defined in training control information when a user has prepared an electronic mail message;
   calculating a training necessity weight by using the risk degree;
   comparing the training necessity weight with a threshold;
   when the training necessity weight is greater than the threshold, changing an attached file name, set by the user in the electronic mail message, to a different attached file name obtained from one of a file name of a file attached to a transmitted electronic mail, a random name generated at random, and a stored name of data stored in a storage of the computer when the electronic mail is transmitted, the different attached file name being different from the attached file name set by the user in the electronic mail;
   outputting to a display device a transmission confirmation screen listing the different attached file name and requesting confirmation of transmission of the electronic mail;
   outputting to the display device message information that varies depending on whether the transmission is confirmed on the transmission confirmation screen, including at least one of
      changing an original destination set by the user in the electronic mail to a previous destination of one of transmitted electronic mails on the transmission confirmation screen,
      adding another destination generated at random to a specified destination set by the user on the transmission confirmation screen, and
      omitting one destination of plural destinations when the plural destinations have been set by the user and displaying remaining ones the plural destinations on the transmission confirmation screen; and
   visualizing and displaying a level of a security countermeasure, based on selection by the user of whether the transmission is confirmed, in accordance with a result of the selection stored in the storage.

2. The non-transitory computer-readable recording medium according to claim 1, the process further comprising transmitting to a transmission source of the electronic mail an electronic mail that includes information indicating that mail erroneous transmission has occurred when the transmission of the electronic mail is selected on the transmission confirmation screen.

3. The non-transitory computer-readable recording medium according to claim 1, the process further comprising outputting information indicating that the attached file name has been changed on the transmission confirmation screen when cancellation of the transmission of the electronic mail is selected on the transmission confirmation screen and outputting a transmission confirmation screen displaying the attached file name set by the user in the electronic mail.

4. An electronic mail erroneous transmission prevention supporting device communicating with a display device, comprising:
   a storage; and
   a processor that executes a process including:
      calculating a risk degree in accordance with a risk calculation rule defined in training control information when a user has prepared an electronic mail message;
      calculating a training necessity weight by using the risk degree;
      comparing the training necessity weight with a threshold;
      when the training necessity weight is greater than the threshold, changing an attached file name, set by the user in the electronic mail message, to a different attached file name obtained from one of a file name of a file attached to a transmitted electronic mail, a random name generated at random, and a stored name of data stored in the storage when the electronic mail is transmitted, the different attached file name being different from the attached file name set by the user in the electronic mail;
      outputting to the display device a transmission confirmation screen listing the different attached file name and requesting confirmation of transmission of the electronic mail;
      outputting to the display device message information that varies depending on whether the transmission is confirmed, including at least one of
         changing an original destination set by the user in the electronic mail to a previous destination of one of transmitted electronic mails on the transmission confirmation screen,
         adding another destination generated at random to a specified destination set by the user on the transmission confirmation screen, and
         omitting one destination of plural destinations when the plural destinations have been set by the user and displaying remaining ones the plural destinations on the transmission confirmation screen; and
      visualizing and displaying a level of a security countermeasure, based on selection by the user of whether the transmission is confirmed, in accordance with a result of the selection stored in the storage.

5. An electronic mail erroneous transmission prevention supporting method comprising:
   calculating a risk degree in accordance with a risk calculation rule defined in training control information when a user has prepared an electronic mail message;
   calculating a training necessity weight by using the risk degree;
   comparing the training necessity weight with a threshold;
   when the training necessity weight is greater than the threshold, changing an attached file name, set by the user in the electronic mail message, to a different attached file name obtained from one of a file name of a file attached to a transmitted electronic mail, a random name generated at random, and a stored name of data stored in a storage of the computer when the electronic mail is transmitted, the different attached file name being different from the attached file name set by the user in the electronic mail;
   outputting by a computer to a display device a transmission confirmation screen listing the different attached file name and requesting confirmation of transmission of the electronic mail;
   outputting by the computer to the display device message information that varies depending on whether the transmission is confirmed, including at least one of changing an original destination set by the user in the electronic mail to a previous destination of one of transmitted electronic mails on the transmission confirmation screen, adding another destination generated at random to a specified destination set by the user on the transmission confirmation screen, and omitting one destination of plural destinations when the plural destinations have been set by the user and displaying remaining ones the plural destinations on the transmission confirmation screen; and visualizing and displaying a level of a security countermeasure, based on selection by the user of whether the transmission is confirmed, in accordance with a result of the selection stored in the storage.

* * * * *